United States Patent
Green et al.

(10) Patent No.: US 11,562,351 B2
(45) Date of Patent: Jan. 24, 2023

(54) INTEROPERABLE MOBILE-INITIATED TRANSACTIONS WITH DYNAMIC AUTHENTICATION

(71) Applicant: ITS, Inc., Johnston, IA (US)

(72) Inventors: Scott Green, Johnston, IA (US); Manish Nathwani, Johnston, IA (US)

(73) Assignee: ITS, Inc., Johnston, IA (US)

( * ) Notice: Subject to any disclaimer, the term of this patent is extended or adjusted under 35 U.S.C. 154(b) by 111 days.

(21) Appl. No.: 16/988,456

(22) Filed: Aug. 7, 2020

(65) Prior Publication Data

US 2021/0042743 A1 Feb. 11, 2021

Related U.S. Application Data

(60) Provisional application No. 62/888,782, filed on Aug. 19, 2019, provisional application No. 62/885,039, filed on Aug. 9, 2019.

(51) Int. Cl.
*G06Q 20/38* (2012.01)
*G06Q 20/32* (2012.01)

(52) U.S. Cl.
CPC ..... *G06Q 20/3823* (2013.01); *G06Q 20/3276* (2013.01); *G06Q 20/3829* (2013.01); *G06Q 20/38215* (2013.01); *G06Q 2220/00* (2013.01); *H04L 2209/56* (2013.01)

(58) Field of Classification Search
None
See application file for complete search history.

(56) References Cited

U.S. PATENT DOCUMENTS

| 7,201,313 | B1 * | 4/2007 | Ramachandran .... | G06Q 20/425 235/472.01 |
| 7,216,800 | B1 | 5/2007 | Ramachandran | |
| 8,632,000 | B2 | 1/2014 | Laracey | |

(Continued)

FOREIGN PATENT DOCUMENTS

| CN | 104599408 B | 5/2015 | |
| EP | 2693687 A1 * | 2/2014 | ............. G06F 21/36 |

(Continued)

OTHER PUBLICATIONS

EMV Integrated Circuit Card Specifications for Payment Systems. Book 1—Application Independent ICC to Terminal Interface Requirements, version 4.3, Nov. 2011, 189 pages. Retrieved from <https://www.emvco.com/document-search/?action=search_documents&publish_date=&emvco_document_version=4-3&emvco_document_book=&px_search=> on Jun. 10, 2021.

(Continued)

*Primary Examiner* — Jacob C. Coppola
(74) *Attorney, Agent, or Firm* — Shook, Hardy & Bacon L.L.P.

(57) ABSTRACT

A transaction is pre-staged by providing transaction preferences, such as a financial instrument, a transaction type, and a transaction amount, to a user device. The user device captures a visual code at a terminal, such as an ATM. The visual code includes terminal attributes, including a signed hash and call-back URI. The user device authenticates the visual code using the signed hash and requests the transaction through the issuer server. The issuer server creates and sends the card data to the call-back URI. The terminal uses the card data to create a transaction request it routes to through its acquirer server.

18 Claims, 16 Drawing Sheets

(56) References Cited

U.S. PATENT DOCUMENTS

| | | | |
|---|---|---|---|
| 9,922,370 B2 | 3/2018 | Kobres et al. | |
| 10,275,827 B2 | 4/2019 | McCarthy et al. | |
| 11,170,363 B1* | 11/2021 | Maeng | G06Q 20/3823 |
| 2013/0005253 A1* | 1/2013 | Grigg | G06Q 20/1085 |
| | | | 705/43 |
| 2013/0124411 A1* | 5/2013 | Kobres | G06Q 40/02 |
| | | | 235/379 |
| 2013/0240621 A1* | 9/2013 | Everett | G06Q 20/3433 |
| | | | 235/379 |
| 2014/0263618 A1* | 9/2014 | McCarthy | G06Q 40/02 |
| | | | 235/379 |
| 2014/0289129 A1* | 9/2014 | Savolainen | G06Q 20/20 |
| | | | 705/67 |
| 2015/0262164 A1* | 9/2015 | Ranganathan | G06F 16/1865 |
| | | | 705/39 |
| 2015/0278811 A1* | 10/2015 | Lalchandani | G06Q 20/202 |
| | | | 705/42 |
| 2015/0339664 A1* | 11/2015 | Wong | G06Q 20/4015 |
| | | | 705/71 |
| 2016/0019536 A1* | 1/2016 | Ortiz | G06Q 20/36 |
| | | | 705/67 |
| 2016/0321644 A1* | 11/2016 | Zeng | G06Q 20/3276 |
| 2018/0285843 A1 | 10/2018 | Chaturvedi | |
| 2019/0312883 A1* | 10/2019 | McCarter | G06N 5/025 |
| 2021/0042743 A1* | 2/2021 | Green | G06Q 20/1085 |

FOREIGN PATENT DOCUMENTS

| | | | | |
|---|---|---|---|---|
| EP | 3185159 A1 * | 6/2017 | | G06F 21/14 |
| IN | 1992MU2013 A | 5/2015 | | |
| JP | 6673585 B2 | 3/2020 | | |
| WO | WO-2012005653 A1 * | 1/2012 | | G06F 21/31 |
| WO | WO-2013133881 A2 * | 9/2013 | | G06Q 20/18 |
| WO | 2014090094 A1 | 6/2014 | | |
| WO | WO-2014118589 A1 * | 8/2014 | | G06Q 20/027 |
| WO | WO-2014119963 A1 * | 8/2014 | | G06Q 20/322 |
| WO | WO-2016059486 A1 * | 4/2016 | | |
| WO | WO-2016079546 A1 * | 5/2016 | | |
| WO | WO-2016134016 A1 * | 8/2016 | | G06Q 20/223 |
| WO | WO-2017182411 A1 * | 10/2017 | | G06F 21/31 |
| WO | WO-2018002792 A1 * | 1/2018 | | |
| WO | WO-2018013431 A2 * | 1/2018 | | G06F 21/31 |

OTHER PUBLICATIONS

EMV Integrated Circuit Card Specifications for Payment Systems. Book 2—Security and Key Management, version 4.3, Nov. 2011, 174 pages. Retrieved from <https://www.emvco.com/terms-of-use/?u=wp-content/uploads/documents/EMV_v4.3_Book_2_Security_and_Key_Management_20120607061923900.pdf> on Jun. 10, 2021.

EMV Integrated Circuit Card Specifications for Payment Systems. Book 3—Application Specification, version 4.3, Nov. 2011, 230 pages. Retrieved from <https://www.emvco.com/terms-of-use/?u=wp-content/uploads/documents/EMV_v4.3_Book_3_Application_Specification_20120607062110791.pdf> on Jun. 10, 2021.

EMV Integrated Circuit Card Specifications for Payment Systems. Book 4—Cardholder, Attendant, and Acquirer Interface Requirements, version 4.3, Nov. 2011, 154 pages.. Retrieved from <https://www.emvco.com/terms-of-use/?u=wp-content/uploads/documents/EMV_v4.3_Book_4_Other_Interfaces_20120607062305603.pdf>on Jun. 10, 2021.

Jetco. Cross-Bank Cardless Withdrawal. Website. 2021. 5 pages. Retrieved from <https://www.jetco.com.hk/en/atm/cardless-withdrawal> on Jun. 9, 2021.

JETCO. JETCO pioneers cross-bank cardless withdrawal service in Hong Kong. Website. 2021. 4 pages. Retrieved from <https://www.jetco.com.hk/en/news/press-releases/cardless-withdrawal> on Jun. 9, 2021.

* cited by examiner

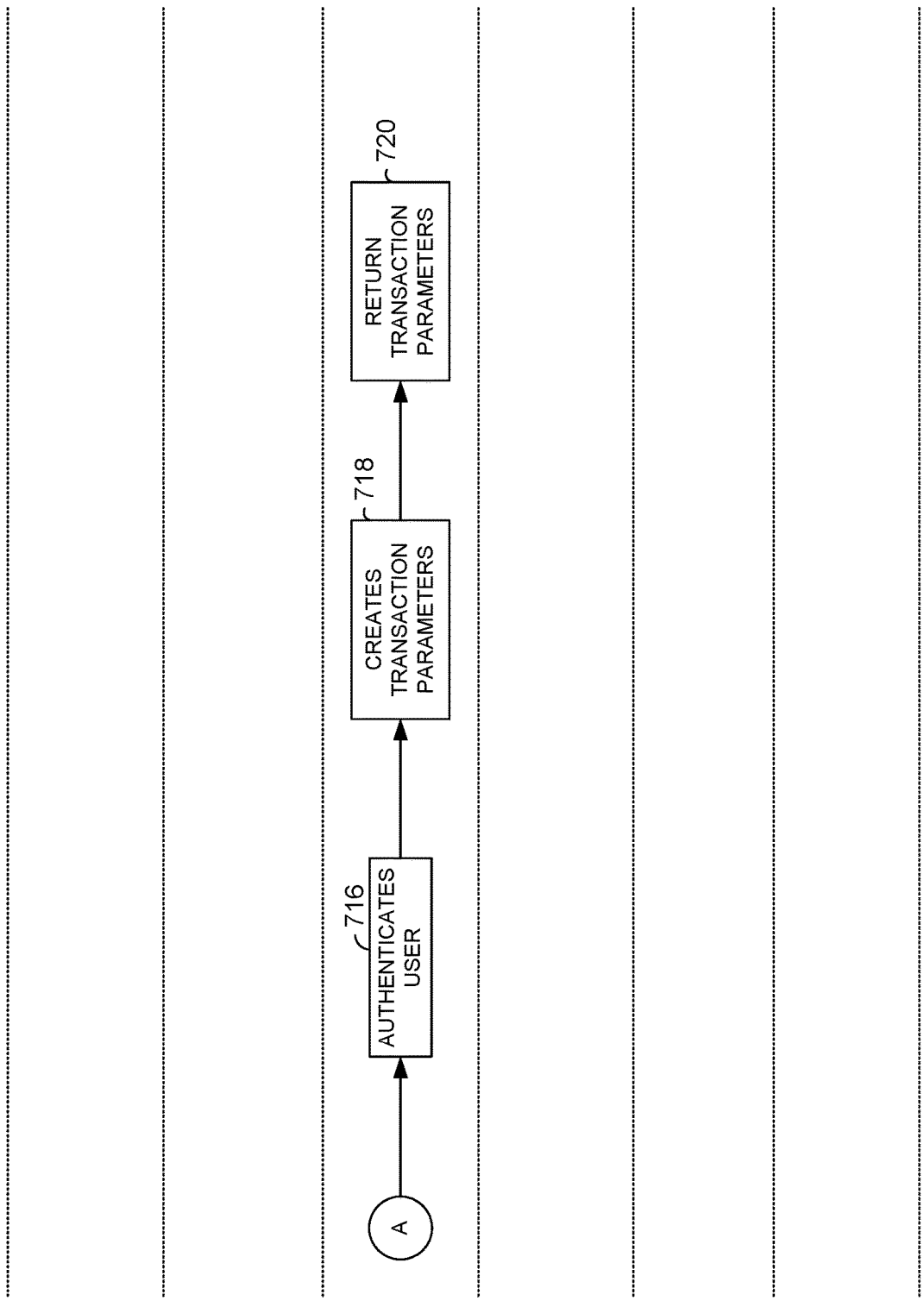

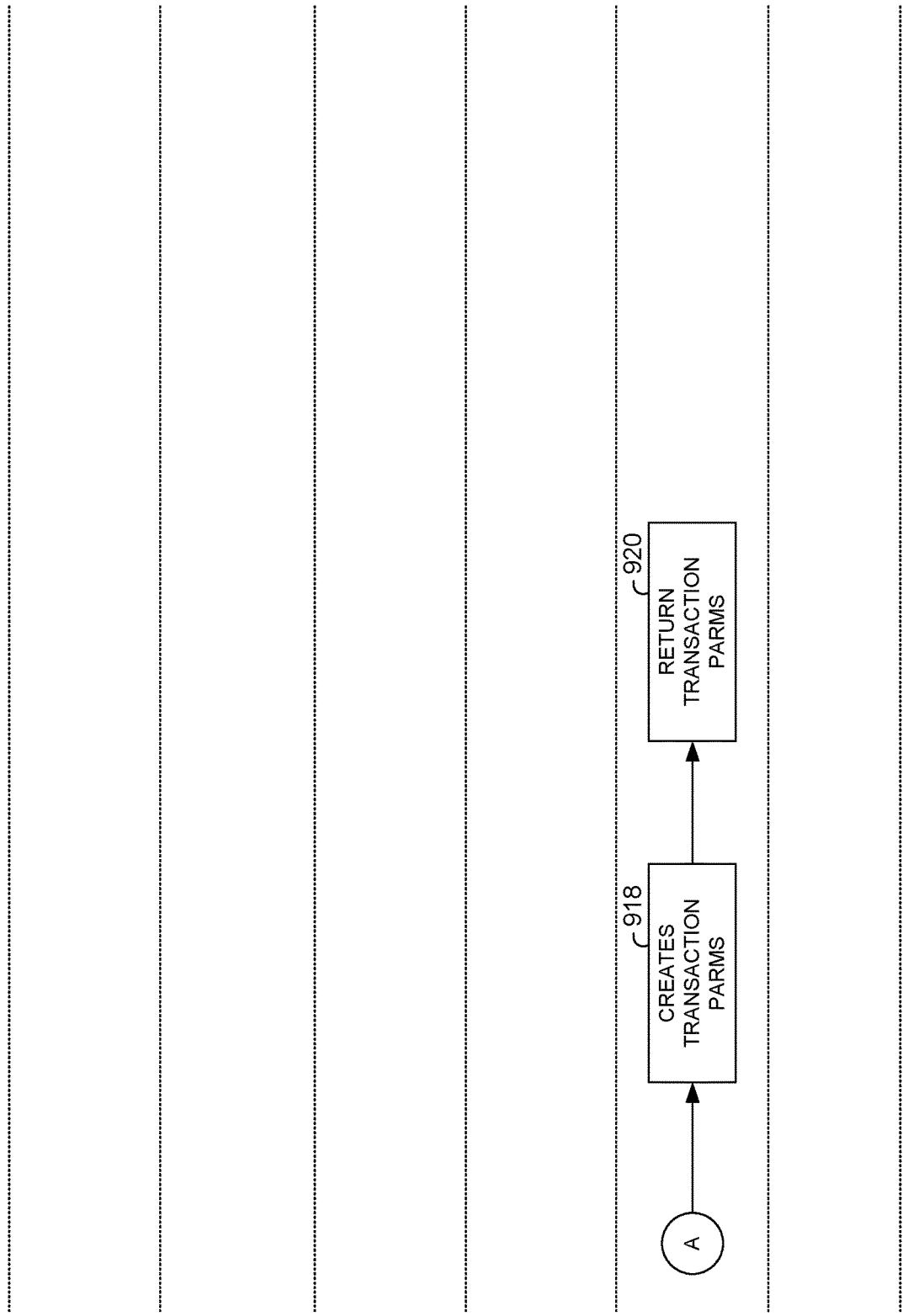

INTEROPERABLE MOBILE-INITIATED TRANSACTIONS WITH DYNAMIC AUTHENTICATION

CROSS-REFERENCE TO RELATED APPLICATIONS

This application claims the benefit of priority to U.S. Provisional Application No. 62/885,039, filed on Aug. 9, 2019, entitled "Interoperable Mobile-Initiated Transactions with Dynamic Authentication,"; and claims the benefit of priority to U.S. Provisional Application No. 62/888,782, filed on Aug. 19, 2019, entitled "Interoperable Mobile-Initiated Transactions with Dynamic Authentication,"; each of which is incorporated by reference in its entirety.

BACKGROUND

More frequently, financial transactions are being conducted using smart devices interacting with various terminals, such as an automated teller machine (ATM). Different types of terminal hardware have been and are continually being developed by various manufactures. Additionally, new mobile-device technology is constantly being introduced. Each of the various devices presents interoperability challenges between other devices, both from a hardware and software perspective. Different devices are constantly requiring hardware and software upgrades to maintain interoperability, while still seeking to facilitate financial transactions in a secure manner.

SUMMARY

At a high level, aspects described herein relate to facilitating a transaction using a user device in conjunction with a terminal using a visual code. Using an application executed by the user device, such as a smartphone, a user may conduct a transaction at a terminal, such as an ATM, without being required to present a physical financial instrument at the terminal, including financial instruments having chip cards that are utilized with host card emulation (HCE).

To do so, a user can pre-stage a transaction at a user device. To pre-stage the transaction, the user can provide transaction preferences at the user device. These may include an account, a financial instrument, or a transaction amount. A unique account identifier that is associated with the account and is generated at an issuer using a private encryption key can be provided so as to maintain security of the account and financial instrument information.

The user device having the pre-staged transaction can work in conjunction with the terminal so that the terminal performs the transaction. To do so, the terminal displays a visual code, such as a QR code, at a display. The visual code is generated by the terminal so that it encodes a terminal detail record (e.g., terminal parameters) that includes an encryption key, which can be a public encryption key, any terminal-specific information, such as the capabilities of the terminal to perform certain transaction types, and a call-back uniform resource indicator (URI).

Upon scanning the visual code, the user device can send any of the transaction preferences, the terminal parameters, or the unique account identifier to the issuer server. The issuer server can then proceed to perform an HCE-type transaction by authenticating the user and validating the account information to authorize the transaction. The issuer server generates the transaction parameters based on the transaction preferences and the terminal detail record (the terminal parameters). If authorized, the authorization providing the transaction parameters can be routed back to the terminal via the call-back URL. The terminal will then perform the transaction in accordance with the transaction parameters.

In another embodiment, the visual code can be scanned prior to pre-staging the transaction. In such cases, the terminal detail record, including the terminal parameters, can be provided to the user device. Using the terminal parameters, the user device provides available transaction parameters that are based on the capabilities of the terminal. The user device then receives an input indicating transaction preferences that are a selection of the available transaction parameters. In this way, the transaction parameters for the transaction can be determined based on the capabilities of the terminal and the transaction preferences provided at the user device.

This summary is intended to introduce a selection of concepts in a simplified form that is further described in the Detailed Description section of this disclosure. The Summary is not intended to identify key or essential features of the claimed subject matter, nor is it intended to be used as an aid in determining the scope of the claimed subject matter. Additional objects, advantages, and novel features of the technology will be set forth in part in the description that follows, and in part, will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
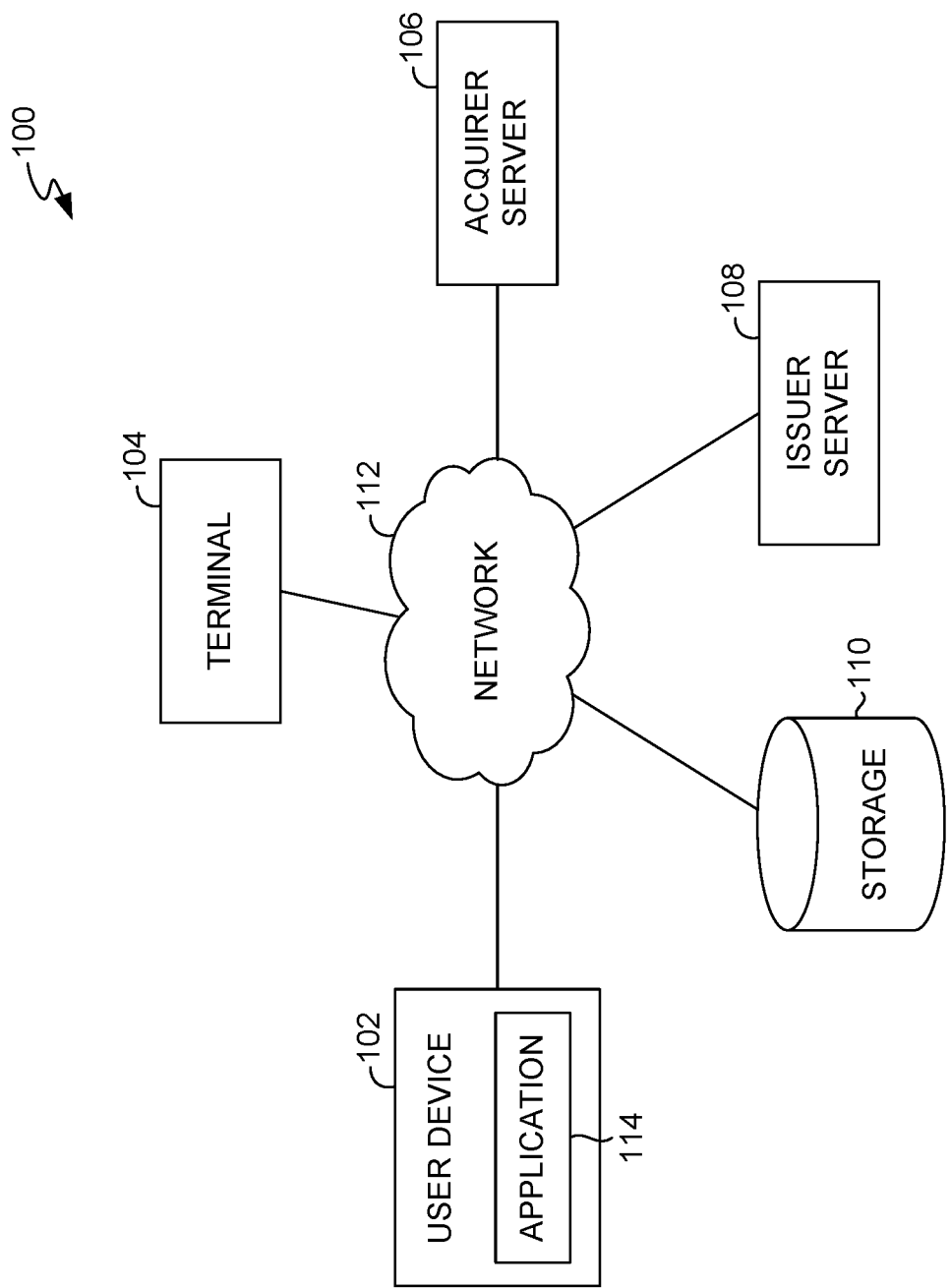
FIG. 1 is an example operating environment in which implementations of the present technology can be employed, in accordance with an aspect described herein.

Consumers increasingly expect the convenience of being able to conduct financial transactions using mobile devices, such as smartphones, smartwatches, and other remotely connected devices. Some of the methods available today for use at the point of sale or at an ATM require the use of near field communication (NFC) methods. However, to provide NFC as an option for use in conducting financial transactions at point of sale terminals (merchant terminals), ATMs, and other terminals, each terminal must be outfitted with particular hardware to utilize such communication protocols. Installation of NFC hardware can be cost-prohibitive with some terminals, or wholly unavailable or impractical in other implementations, such as a personal computer acting as a terminal. To avoid prohibitive hardware installations, alternative methods of conducting financial transactions have used Quick Response (QR) codes as an NFC alternative. However, to date, conventional QR code methods have not allowed for interoperability and routing choice. Other attempted solutions use static forms of card authentication, which are subject to replay attacks in many cases.

The technology presented by this disclosure utilizes visual codes (such as QR codes, barcodes, or any other data matrices) to increase the interoperability of user devices and terminals through user device applications and terminal applications. The visual code methods provided by this disclosure allow the facilitation of financial transactions in ways that are better alternatives to NFC, since there is no required NFC hardware to enable its protocols. Further, unlike the conventional QR methods previously discussed, some of the visual code methods provided by this disclosure do not require a central authority to act as a middleware for interoperability, thus freeing up alternative authentication options and enabling a greater number of financial transaction routing choices. In this way, a greater number of hardware terminals are usable, while at the same time, increasing the security of the financial transactions. Since the middleware can be avoided, this eliminates attacks against the transaction at the middleware point. The technology further enables the use of host card emulation (HCE) on a secure cloud environment, where chip card data may be created.

To provide these benefits, aspects of the described technology combine visual codes (e.g., a QR code) and public key cryptography for authenticating and passing information between various components of a financial transaction ecosystem in a secure way. For instance, a user device may operate in conjunction with a terminal to complete a transaction, including depositing or receiving funds from an account.

One example method pre-stages a transaction on a user device. To pre-stage a transaction, the user device may receive inputs that indicate a transaction amount and a unique identifier for an account. The user device may also receive user transaction preferences with specific instructions for the transaction. Transaction preferences generally include any adjustable parameters associated with the transaction. Example preferences include denomination size and count, printed receipts, selection of a specific financial account or financial instrument, inclusion of a reference note, and so forth.

The user device may authenticate the user to increase security. Methods that may be employed by the user device include facial recognition, passcodes, voice recognition, biometric recognition, and the like. In one specific embodiment, the authentication is linked to the transaction preferences, such that the default transaction preferences are autogenerated upon authentication of the user.

The user device can capture a visual code provided by the terminal. The terminal generates the visual code in a manner that encodes a terminal detail record, e.g., the terminal parameters. The terminal detail information includes an encryption key, i.e., an "encryption key," and a uniform resource indicator (URI). In some cases, the terminal detail information includes available terminal functions, which indicate the capabilities of the terminal and can be used to determine the transaction parameters.

Upon receiving the terminal detail information, including the encryption key, the user device creates encrypts a message having the transaction parameters and the unique account identifier. The user device can route the transaction preferences and the unique identifier to an issuer server.

The issuer server decodes the encrypted message using the encryption key. The issuer server also decodes the unique account identifier using a private encryption key generated by HCE software. Then, using the transaction preferences, the issuer can authenticate the transaction and generate transaction parameters that are provided to the terminal via the URI and instruct the terminal to facilitate the transaction. This may be similar to a chip-card type transaction in some cases.

By performing the transaction in this manner, the security benefits of a chip card, or HCE transaction, are realized without the physical presence of the card. Thus, the same level of security benefits can be achieved using the user device and the terminal, again, without actually needing the chip card to interact with the terminal. Additionally, the interoperability between user devices and terminals is increased by allowing more terminals than would otherwise be available when using the chip card, as some terminals do not have the hardware to interact with chip cards, but can instead, be equipped with the software of the present disclosure to still conduct chip-card like transactions based on the user device. The technology provides the security benefits of HCE-type transactions facilitated through the use of visual codes and eliminates the required hardware to facilitate the same transaction using NFC.

Having provided one example of the technology, various other embodiments for facilitating financial transactions between a user device and a terminal using visual codes are provided or will be understood from the description that follows, which references the drawings.

Turning now to FIG. 1, FIG. 1 illustrates example operating environment 100 in which implementations of the technology can be employed. In particular, FIG. 1 illustrates a high-level architecture of operating environment 100 that has components suitable for use with the described technology.

Among other components not shown, operating environment 100 includes user device 102, terminal 104, acquirer server 106, issuer server 108, and storage 110. Components of operating environment 100 are shown communicating using network 112.

It is noted that any number or combination of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are intended as examples in nature and in number, and are not to be construed as limiting for all implementations of the present disclosure.

Figure 11:
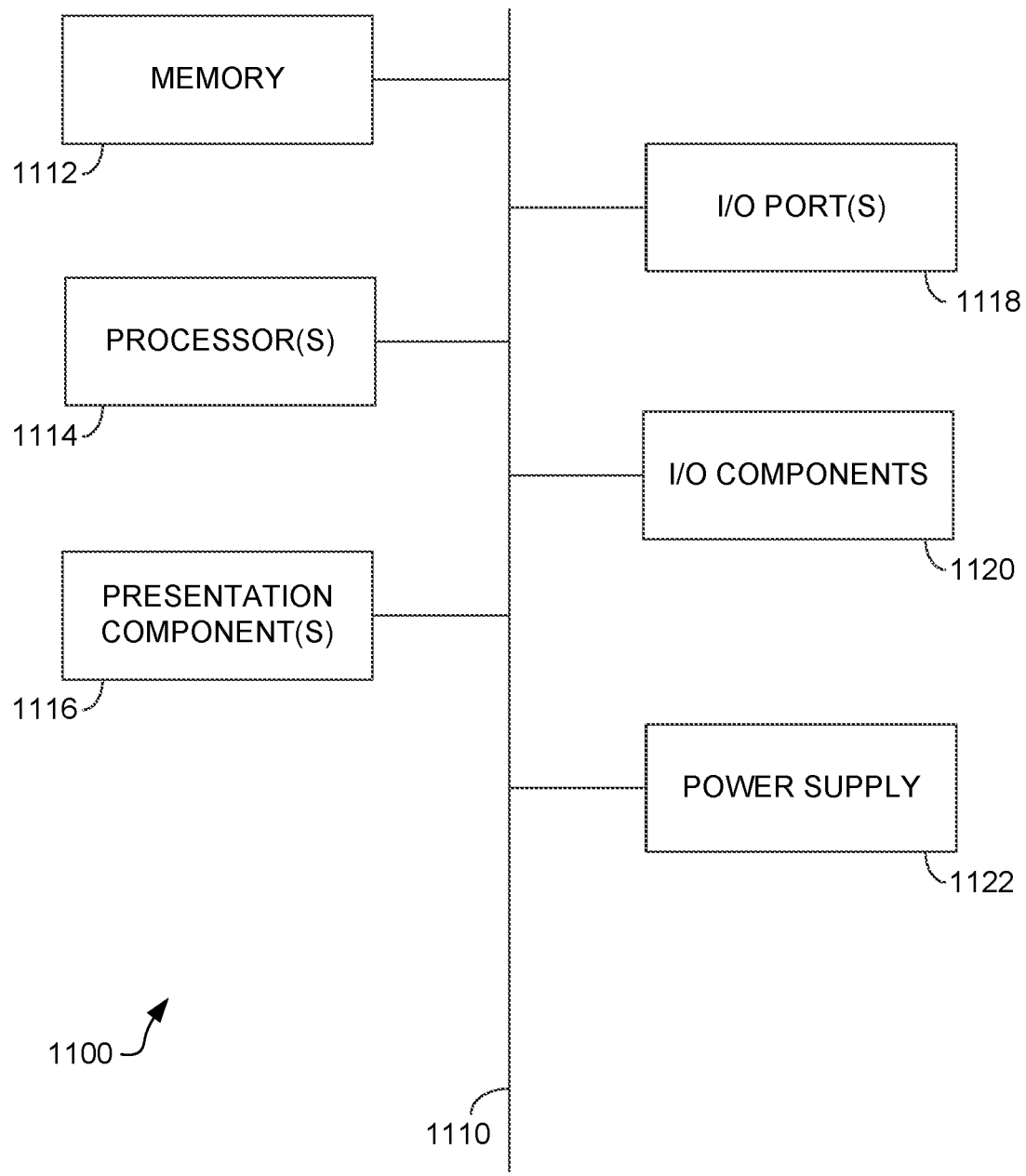
FIG. 11 is an example computing device suitable for employing aspects of the technology, in accordance with an aspect described herein.

Continuing with FIG. 1, user device 102 can be any type of computing device capable of being operated by a client, which may be any person or entity that utilizes aspects of operating environment 100. While operating environment 100 depicts a single user device, it will be understood that there may be any number of user devices, which may also communicate with each other and with the other components of operating environment 100 using network 112. Computing device 1100 described in relation to FIG. 11 is suitable for use as user device 102. As examples, user device 102 may be embodied as a personal computer (PC); a laptop computer; a mobile device, such as a smartphone, a tablet computer, a smartwatch, a wearable computer, a personal digital assistant (PDA), a global positioning system (GPS), a handheld communications device, or other portable device, a video player; a gaming device or other entertainment system, a vehicle computer system; an embedded system controller; a remote control; an Internet-of-Things (JOT) device, such as an appliance or a consumer electronic device; a workstation; any combination of these delineated devices; or a like device. User device 102 can comprise a camera for capturing and processing visual information, such as a visual code.

User device 102 can include one or more processors and one or more computer-readable media. The computer-readable media may include computer-readable instructions executable by the one or more processors. The instructions may be embodied by one or more applications, such as application 114 shown embodied on user device 102. Application 114 is referred to as a single application for simplicity, but its functionality can be embodied by one or more applications in practice, and may reside in part or in whole on, or wholly remote from, user device 102.

Application 114 is generally capable of facilitating the exchange of information between components of operating environment 100. For example, application 114 facilitates receiving information via inputs at input components of user device 102, communication of information to terminal 104, acquirer server 106, and issuer server 108, and receiving information from terminal 104, acquirer server 106, and issuer server 108. Application 114 may provide received information as outputs via output components of user device 102.

In some implementations, application 114 comprises a web application, which can run in a web browser, and could be hosted at least partially on the server side of operating environment 100. Application 114 can comprise a dedicated application, such as an application having analytics functionality. In some cases, application 114 is integrated into the operating system (e.g., as a service or program). It is contemplated that "application" be interpreted broadly.

In general, terminal 104 is a hardware system that is used to facilitate a financial transaction. In a specific embodiment, terminal 104 facilitates a financial transaction in conjunction with user device 102. Terminal 104 may comprise aspects of a computing device, such as computing device 1100 of FIG. 11, including a processor and computer storage media. Terminal 104 may also comprise a display device. The display device may visually display a visual code generated or received by terminal 104. One specific example of a terminal that could be used as terminal 104 is an ATM. An ATM is generally a device that allows users to perform financial transactions with one or more financial institutions, including withdrawing and depositing money. In another example, terminal 104 is a personal computer performing an online transaction. In yet another example, terminal 104 is a merchant computing device at a merchant location that is used to facilitate a financial transaction between a merchant and user device 102.

Acquirer server 106 is generally a server hosted by an acquirer. Acquirer server 106 may take the form of a computing device, such as computing device 1100 of FIG. 11. Acquirer server 106 may perform tasks associated with processing financial transactions. An acquirer may include within its network one or more terminals in communication with acquirer server 106. In practice, the acquirer may sometimes be referred to as a "processor."

Issuer server 108 is generally a server hosted by an issuer. Issuer server 108 may take the form of a computing device, such as computing device 1100 of FIG. 11. Issuer server 108 may perform various tasks associated with the issuance or maintenance of a financial instrument, such as a credit or debit card, or a financial account. Issuer server 108 may perform tasks that include verifying whether such financial instruments or accounts are authentic.

Network 112 may include one or more networks (e.g., public network or virtual private network "VPN"). Network 112 may include one or more local area networks (LANs), wide area networks (WANs), or any other wired or wireless communication network or method. Network 112 may use any type, or any combination, of communication protocol to facilitate the exchange of information between any of the components.

Database 110 generally stores information including data, computer instructions (e.g., software program instructions, routines, or services), or models used in embodiments of the described technologies. Although depicted as a single database component, database 110 may be embodied as one or more databases or may be in the cloud.

Figure 2:
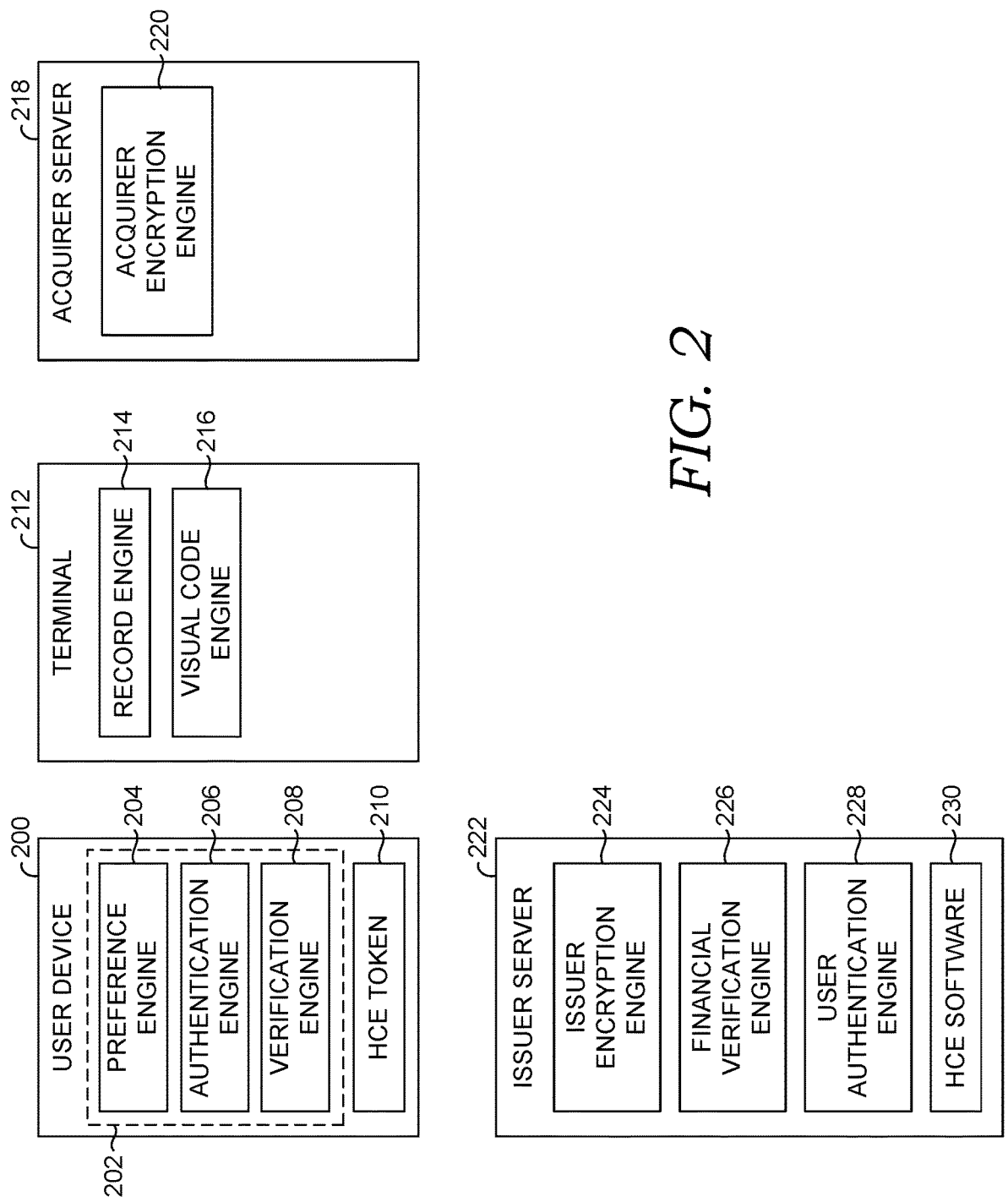
FIG. 2 is a block diagram illustrating one or more components suitable for use in facilitating a transaction using a visual code, in accordance with an aspect described herein.

With reference now to FIG. 2, FIG. 2 is a block diagram illustrating functional aspects of one or more of the components that are suitable for implementing the technology. One or more of the components illustrated in FIG. 2 may be suitable for use as one or more of the components illustrated in FIG. 1.

With regard to FIG. 2, other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. The term engine is synonymous with such functional entities or systems. Various functions described herein as being performed by one or more entities may be carried out by hardware, firmware, or software. For instance, various functions may be carried out by a processor executing instructions stored in memory.

Continuing with reference to FIG. 2, user device 200 is illustrated having application 202 that can be invoked by user device 200 to execute preference engine 204, authentication engine 206, and verification engine 208. User device 200 is further illustrated as comprising HCE token 210. It is intended that the described functionality may be executed by any component or any combination of components illustrated in FIG. 2, including one or more of the illustrated components.

Preference engine 204 generally receives user transaction preferences for a transaction. As noted, preferences generally refer to any adjustable parameter associated with the financial transaction. Preferences can include a selection of a particular financial institution, a selection of a particular financial instrument, a selection of a particular account or account type, an amount of a transaction (the "transaction amount"), a size and count of the denominations totaling the transaction amount, an associated transaction note provided by the user, and the like.

Preference engine 204 may provide options for preferences for a transaction. The options may be limited based on capabilities of a terminal being used with user device 200 to facilitate a transaction. Here, preference engine 204 can receive from the terminal via a visual code the capabilities of the terminal with respect to the transaction. The capabilities of the terminal may also be included in information received from issuer server 222. That is, preference engine 204 may receive what transaction preferences associated with the transaction are available based on the specific terminal. For example, if the terminal is suitable for deposit only, preference engine 204 does not provide a preference related to withdrawal when providing options for preferences for the transaction. In this way, preference engine 204 provides only the available preferences for the transaction being facilitated by the terminal. Using another example, if the terminal does not contain a single dollar denomination, then the provide preference options will not include the ability to select single dollar denominations as a transaction preference.

Authentication engine 206 generally authenticates a user associated with a user device. This may be done to determine whether the user is authorized to conduct a financial transaction. Authentication engine 206 may use hardware and software associated with user device 200 to authenticate a user. Authentication engine 206 can use facial recognition via a camera of user device 200. Authentication engine 206 may use the camera for other forms of recognition, such as some biometric recognition methods, including iris recognition. Authentication engine 206 may use touch sensors associated with user device 200 to identify and determine a fingerprint. In another example, authentication engine 206 can receive a unique passcode. Other forms of authentication, including forms of multifactor authentication, and the use of tokens, are contemplated. Authentication engine 206 can use such forms of recognition to compare user authentication information (a face, fingerprint, etc.) to known information about a user to determine whether the user has permission to engage in certain financial transactions. If so, authentication engine 206 authenticates the user by allowing the user to engage in the financial transaction using user device 200.

Verification engine 208 generally verifies terminal information. Verification engine 208 can verify a terminal certification or hash. Verification engine 208 can use a terminal's certification or hash to verify that the terminal information has not been corrupted, which could jeopardize the security of the transaction. To do so, terminal information, such as a terminal detail record, can be provided to user device 200 via a visual code displayed by terminal 212. Verification engine 208 can verify the authenticity of the terminal information using the terminal's certification. Verification engine 208 can also verify the authenticity of the information by generating a hash value for the terminal information and comparing it to a hash received via the visual code provided by terminal 212. If the hash values match, then the information is authentic. User device 200 can permit the transaction to proceed upon verifying the terminal information. For example, a terminal, such as terminal 212, can be issued a public and private cryptographic key pair. When the visual code is generated by the terminal, it hashes the terminal information and signs the hash with its private key. User device 200 can verify the signature is valid for the terminal using its public key. The hash can be generated and compared to ensure no data was altered. Where data size constraints are prohibitive, the visual code can be generated having a reference to the certificate authority and a serial number for the terminal certificate. Using the reference to the certificate authority and the serial number, user device retrieves the terminal certificate and public key. In this way, the data encoded by the visual code does not have to include a large amount of information. By including the reference, user device 200 can retrieve the terminal certificate over a network where it can be downloaded.

In general, application 202 can be used to facilitate a transaction with terminal 212. In some cases, the transaction facilitated by application 202 can be pre-staged. Pre-staging a transaction includes using one or more of preference engine 204 to set the transaction preferences, authentication engine 206 to authenticate the user, and verification engine 208 to verify the transaction. The information provided by these elements as part of the pre-staged transaction may be stored locally at user device 200 or remotely at issuer server 222 or the cloud. Pre-staging a transaction can be performed using user device 200 at a location remote from terminal 212 or in proximity the terminal location (e.g., in communication range). In another embodiment, application 202 facilitates the transaction with terminal 212 without pre-staging the transaction. This can be done by receiving terminal parameters of terminal 212, and then using preference engine 204 to determine transaction preferences based on the terminal parameters. That is, preference engine 204 can provide options for transaction preferences that are within the abilities of terminal 212, as determined by the terminal parameters.

User device 200 is also illustrated as comprising HCE token 210, also referred to as a unique account identifier. HCE token 210 is generally a cryptogram that is a cryptographic representation of a financial instrument (e.g., credit or debit card) or account associated with an issuer. HCE token 210 is a product of HCE software 230 that will be discussed in more detail. Briefly, HCE token 210 is used by user device 200 to enable HCE transactions, or "chip card"-like transactions between user device 200 and terminal 212.

Terminal 212 generally works in conjunction with user device 200 to facilitate a transaction. As previously noted, among other things, terminal 212 may take the form a personal computer connected to the Internet or a merchant computing system at a merchant location. Commonly, terminal 212 will be an ATM that facilitates withdrawing funds from a financial institution and providing the funds to a user.

Terminal 212 of FIG. 2 is illustrated as comprising record engine 214 and visual code engine 216. Record engine 214 generally retrieves terminal information included in the terminal detail record and provides the terminal information to visual code engine 216. Terminal information may include encryption keys, such as terminal public key associated with an acquirer. The terminal information can further include a URI that can be used by user device 200 as a location for returning encrypted messages. The location may include terminal 212 and using the URI, the encrypted messages may be routed to terminal 212 through a gateway, such as an ATM gateway. Additional terminal information can include adjustable parameters associated with the terminal that can be used to determine transaction preferences. For instance, the size of denominations available, the location of the terminal, the acquirer associated with the terminal, and the like.

Visual code engine 216 generally encodes the terminal information provided as the terminal detail record into a visual code. One such method is the generation of a QR code. Other visual codes can be generated to encode the visual information. Visual code engine 216 provides the generated visual code to a display device for display at terminal 212. While it is contemplated that any visual codes can be used, QR codes offer a benefit in that they provide a set standard that is widely accepted by many applications. Visual code engine 216 can generate a QR code in accordance with ISO/IEC 18004:2015 standards.

Acquirer server 218 generally serves as a remote server associated with terminal 212 and assist in routing messages to terminal 212. Acquirer server 218 may be associated with multiple terminals. Acquirer server 218 may receive information from user device 200 via the URI provided by terminal 212. Acquirer server 218 is illustrated as including acquirer encryption engine 220, which includes a copy of the encryption keys provided by terminal 212 to user device 200. In this way, acquirer encryption engine 220 decrypts the message provided by user device 200 in order to facilitate processing of the transaction. The messages provided by user device 200 can include the transaction preferences, such as those discussed, including the financial institution or account, a unique account identifier, and any other adjustable parameters provided at user device 200. Acquirer server 218 can use information about the financial institution to route the message to the correct issuer server, such as issuer server 222. ISO 8583 standards could be employed to facilitate messaging protocols.

Issuer server 222 generally verifies and approves the transaction. An issuer may be associated with a financial institution having financial accounts and issuing financial instruments. Generally, the issuer server will verify the financial transaction based on the account. For instance, issuer server 222 may verify an account includes enough funds to disperse the amount requested by the transaction as determined from the transaction preferences.

To do so, issuer server 222 is illustrated as including issuer encryption engine 224. Issuer server 222 is sometimes referred to as a "TxP Server," meaning an "issuer's transaction processing system." Issuer encryption engine 224 generally includes encryption keys for decrypting and encrypting information provided by and received from user device 200, terminal 212, or acquirer server 210. Issuer encryption engine 224 may use any encryption methods known in the art. Issuer encryption engine 224 may utilize private encryption keys.

Financial verification engine 226 generally verifies whether the financial transaction can occur based on account information. The financial transaction may include information identifying an account, such as a unique account identifier, which may be received from user device 200, terminal 212, or acquirer server 218. Financial verification engine 226 can identify an account or financial instrument associated with the user, and further identify the account's current status, such as available funds, available credit line, and so forth. Financial verification engine 226 verifies whether the financial transaction can be performed based on the account status and the transaction preferences. For instance, financial verification engine 226 can approve a financial transaction by verifying that there is a greater amount of funds or available credit than the amount identified in the transaction preferences.

User authentication engine 228 generally identifies and authenticates the user. As noted, the transaction information may identify the user. User authentication engine 228 can cross-reference known information about a user with the identifying user information to determine whether the user associated with user device 200 that is requesting the financial transaction is authorized to conduct such a transaction. If so, then user authentication engine 228 can authenticate the user and allow the transaction to proceed.

HCE software 230 generally provides a virtual representation of an electronic transaction card, also referred to as a "chip card." HCE software 230 is primarily responsible for generating the cryptogram associated with HCE token 210. Issuer server 222 may provide HCE token 210 to user device 200 for use in a transaction. HCE software 230 may employ issuer encryption engine 224 for use in encrypting information, including HCE token 210. HCE token 210 may be generated as a dynamic cryptogram. In some cases, the encryption performed by HCE software 230 uses a private encryption key. HCE software 230 uses a cryptographic process to emulate the security of prior hardware-based elements (e.g., a "chip"). HCE software that is suitable for use as HCE software 230 will be known to those of ordinary skill in the art. As such, the cryptographic processes performed by various HCE software are not described in detail. Generally, however, users can enroll financial accounts or financial instruments for use with HCE software 230 to enable HCE transactions, or "chip card" transactions, using user device 200, which passes HCE token 210 from issuer server 222 to user device 200. In some aspects, HCE software 230 is compliant with the Common Core Definition (CCD) introduced in 2004 as part of 4.1 EMV (Europay, Mastercard and Visa) specifications.

Figure 3:
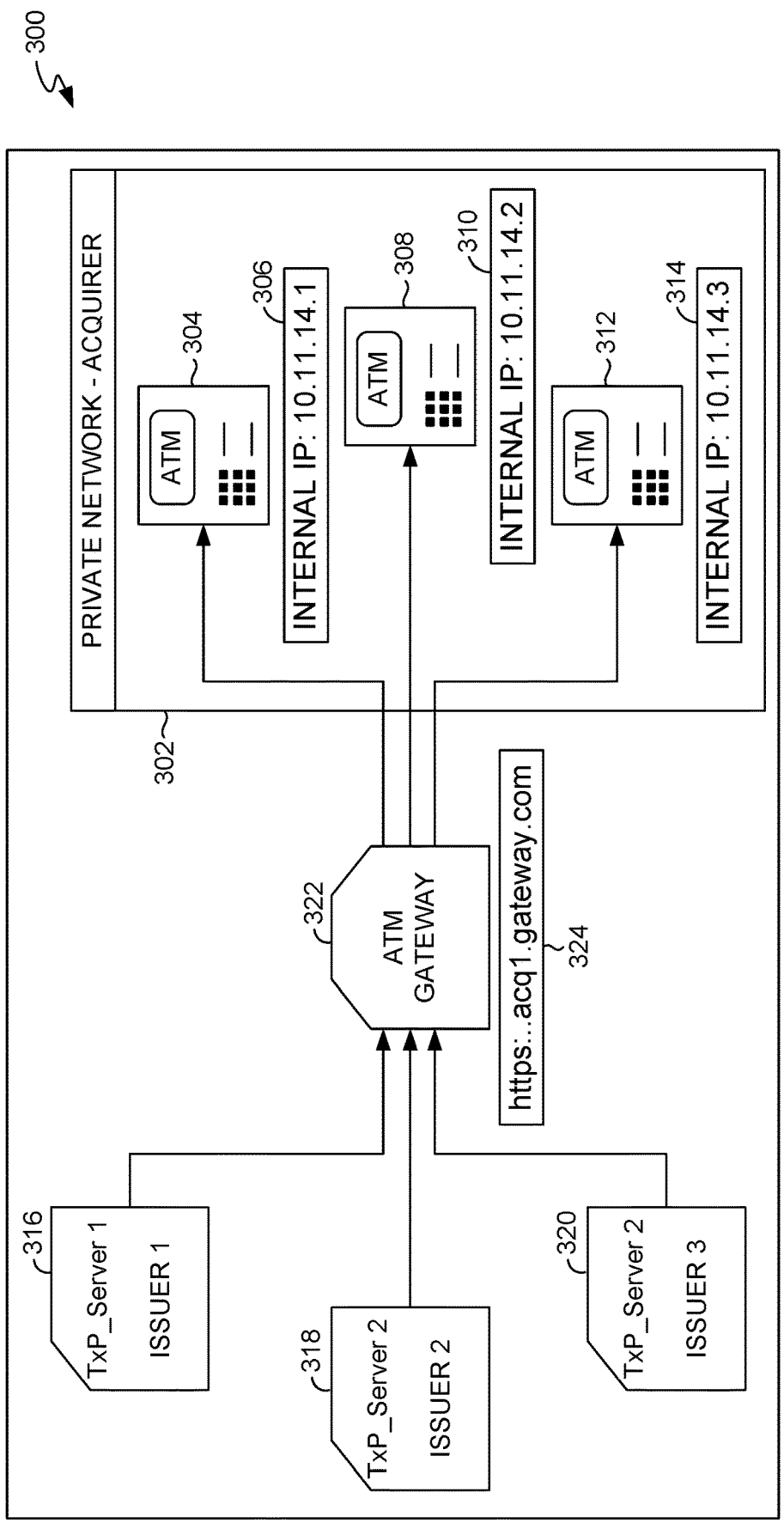
FIG. 3 is an example system architecture suitable for facilitating a transaction using a visual code, in accordance with an aspect described herein.

FIG. 3 illustrates example system architecture 300, which suitable for use with the present technology. In particular, FIG. 3 provides one example system architecture where the system's terminals are ATMs. In this particular case, system architecture 300 includes an acquirer having acquirer private network 302. Acquirer private network 302 comprises a plurality of terminals. It is contemplated that acquirer private network 302 may include any number of terminals, including one or more terminals. However, for more simplistic illustration, acquirer private network 302 is illustrated with first ATM 304 having first ATM IP address 306, second ATM 308 having second ATM IP address 310, and third ATM 312 having third ATM IP address 314.

System architecture 300 also includes a plurality of issuers, each having an issuer server, or "TxP_Server." It is also contemplated here that any number of issuers may be within system architecture 300, including one or more issuers. However, again for simplistic illustration, system architecture 300 is shown having first issuer server 316 associated with a first issuer, second issuer server 318 associated with a second issuer, and third issuer server 320 associated with a third issuer.

Each of issuer servers 316, 318, and 320 are in communication with each of the ATMs 304, 308, and 312, via ATM gateway 322, which includes ATM gateway URL 324. ATM gateway 322 can comprise router/reverse proxy, such that issuer servers 316, 318, and 320 can connect to ATMs 304, 308, and 312. This may be done using callback URIs provided in the visual code after an issuer server generates a cryptogram and EMV data with the help of HCE. Since many types of terminal devices (e.g., ATMs 304, 308, and 312) of a given acquirer are behind firewalls, it could be challenging for the issuer servers 316, 318, and 320 to establish secure connections with the terminal devices (the ATM) that generate the visual codes. Thus, using a proxy server (e.g., ATM gateway 322) avoids exposing each terminal device to the outside world. The communication protocol between an issuer server and ATM gateway 322 can, for example, be JSON (JavaScript Object Notation) over HTTPS (Hypertext Transfer Protocol Secure). ATM gateway 322 receives transaction data from an issuer server (TxP server). It authenticates that the data came from a valid issuer or issuer server, such as issuer servers 316, 318, and 320, and that the data has not been altered. ATM gateway 322 then distributes that transaction data to the terminal device, where the terminal software uses the data to resume transaction processing. As will be discussed, the terminal software can be a terminal plug-in. Following this, the terminal device can verify a user, for instance, by prompting for a PIN or other form of identification. The terminal device sends an authorization request using the staged data and any new data, such as the PIN or other form of identification, and routes it through the acquirer server using a network. ISO 8583 standards can be used to facilitate messaging through the network.

Figure 4:
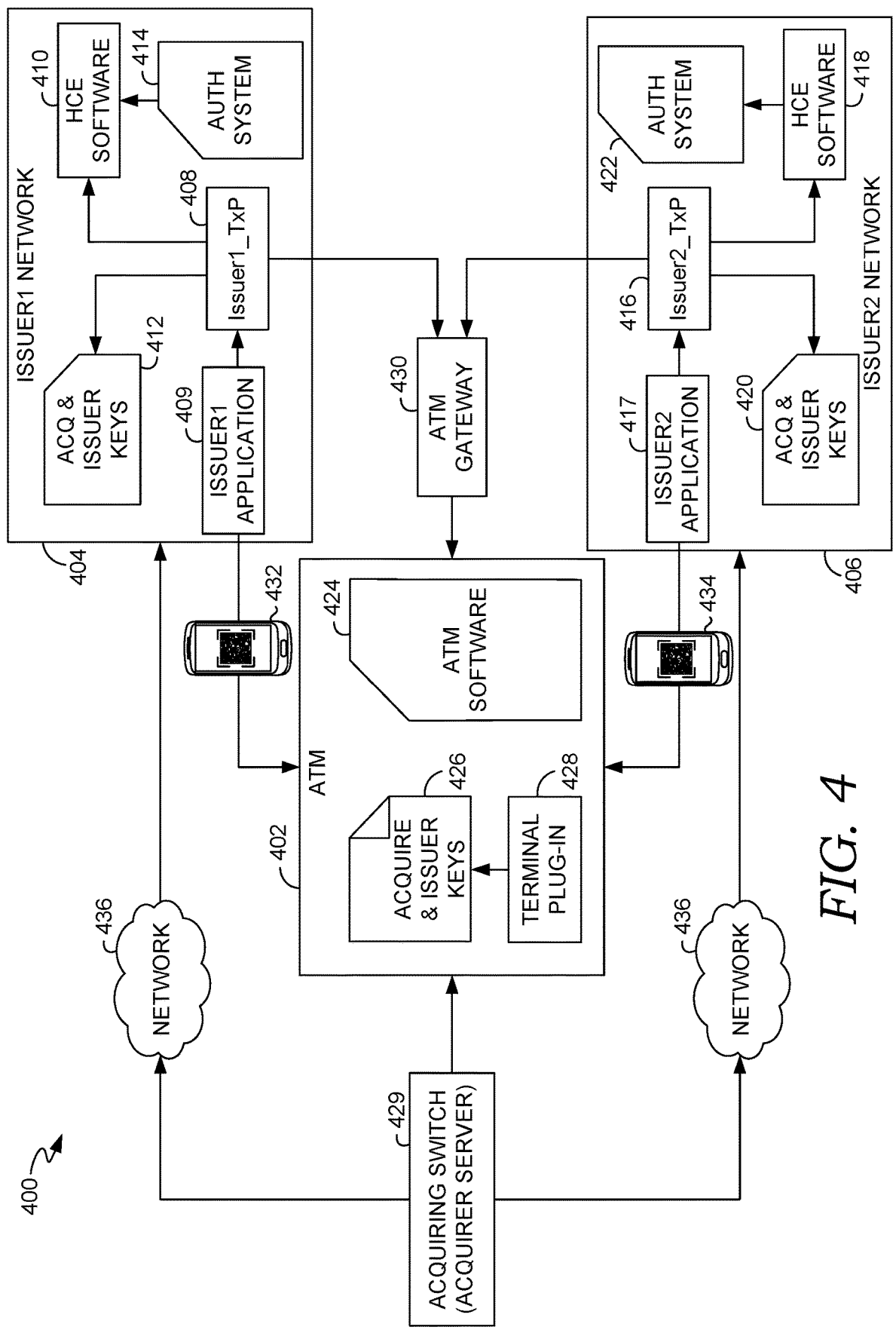
FIG. 4 is a block diagram of an example system suitable for facilitating a transaction using a visual code, in accordance with an aspect described herein.

FIG. 4 is an example block diagram of example system 400, which is suitable for use with aspects of the present technology. Example system 400 additionally includes a flow diagram depicting one example use-case of the present technology.

With reference to FIG. 4, system 400 includes a terminal that is depicted as ATM 402, and two issuer networks shown as first issuer network 404 and second issuer network 406. Example system 400 is provided as a simple example to assist in describing the technology. However, it will be recognized that additional or fewer components may be part of the system or the operations, including additional terminals and issuers. Further, first issuer network 404 and second issuer network 406 may be different networks that are part of the same issuer of a financial instrument or may represent different networks of different issuers of financial instruments.

First issuer network 404 is shown comprising first issuer server 408 (labeled as "Issuer1_TxP"), first issuer application 409, first HCE software 410, first acquirer and issuer keys 412, and first authentication system 414. As noted, acquirer keys can be associated with an acquirer network of terminals and can include public encryption keys. Issuer keys can be associated with an issuer of a financial instrument and can include private encryption keys for encrypting account information. Similarly, second issuer network 406 is shown comprising second issuer server 416 (labeled as "Issuer2_TxP"), second issuer application 417, second HCE software 418, second acquirer and issuer keys 420, and second authentication system 422. Authentication engine 206 of FIG. 2 is suitable for use as first authentication system 414 or second authentication system 422.

System 400 is further illustrated as having ATM 402 that includes ATM software 424, which is generally responsible for the operations of the ATM hardware, acquirer and issuer keys 426, and terminal plug-in 428. System 400 also depicts two user devices, first user device 432 and second user device 434. While shown with only two user devices, in practice, any number of user devices may be present, including one or more user devices.

Terminal plug-in 428 comprises software provided to ATM 402 to instruct the ATM hardware on how to work in conjunction with user devices using visual codes. Terminal plug-in 428 can provide instructions to ATM 402 to generate and display a request for withdrawing funds using a user device. When selected, control can go to terminal plug-in 428. Terminal plug-in 428 generates a visual code that has encoded information regarding the terminal, or ATM 402 in this example. It may then wait for a pre-defined timeframe to receive a call back from an issuer server that is providing transaction information. After receiving the call back from the issuer server, such as first issuer server 408 or second issuer server 406, terminal plug-in 428 can give control back to ATM software 424. Under instructions from ATM software 424, ATM 402 may prompt a user associated with the user device for a PIN (Personal Identification Number) entry, after which time ATM 402 can initiate a transaction by disperse the withdrawal. From the perspective of acquiring switch 429, the transaction appears to be initiated from a physical card and it can process the transaction in a similar manner to physical card transactions.

In this way, the software plug-in (terminal plug-in 428, for example) can be added to existing terminal hardware (such as ATM 402). This enables the existing hardware to be able to complete a transaction using the visual code, while at the same time, it does not require reconfiguration of backend hardware systems, such as acquiring switch 429 and issuer servers, such as first issuer server 408 and second issuer server 416. The software plug-in, in cooperation with an application of a user device, allows the hardware systems to interact in a manner that they previously could not, yet maintain the same security of a chip-card type transaction, while not requiring the presence of the physical chip card. Further, such software plug-ins can be provided to various ATM types. When the software plug in takes control, it provides the encryption keys to enable the dynamic cryptograms familiar to HCE operations, and the call-back URI, which can be used to route the information back to the ATM (or a terminal, more generally). In this way, various issuer servers, from one or more issuers, can work with the ATM to enable the financial transaction. Ultimately, this also serves to increase the number of hardware options for use with user devices and increase the number of issuer servers that can facilitate transactions the terminals. An additional benefit is that the software plug-in can be installed on some terminals that cannot receive chip-cards, thus enabling the terminals to engage in more secure HCE-type transactions, without reconfiguring the terminal to access the physical chip card.

Communication between ATM 402, first issuer network 404, and second issuer network 406 is assisted by acquiring switch 429 (i.e., acquirer server) and ATM gateway 430. Communication between these components, along with first user device 432 and second user device 434, may be performed through network 436. Network 112 described with reference to FIG. 1 is suitable for use as network 436.

Continuing with reference to FIG. 4, first HCE software 410 and second HCE software 418 can be used to create and securely store financial instrument profiles for users associated with first user device 432 and second user device 434, respectively. As part of the financial instrument profiles, first HCE software 410 can be used to create a first token for the first financial instrument using first acquirer and issuer keys 412. Similarly, second HCE software 418 can be used to create a second token for the second financial instrument using second acquirer and issuer keys 420. The first token can be provided to first user device 432, while the second token can be provided to second user device 434.

First issuer application 409 and second issuer application 417 may be similar to application 202 described with reference to FIG. 2. First issuer application 409 may be executed by first user device 432, and second issuer application 417 may be executed by second user device 434.

Using first issuer application 409, first user device 432 can pre-stage a transaction, such as a cash withdrawal at ATM 402. To pre-stage a transaction, first user device 432 can receive inputs indicating transaction preferences. This may include unique account identifier to assist in identifying the user or the user's account. The inputs can further identify any adjustable parameters within the transaction, e.g., withdrawal amount, financial instrument, denomination size and count, and so forth. The transaction preferences can be stored locally or may be passed to first issuer server 408. First issuer application 409 can encrypt the transaction preferences using first acquirer and issuer keys 412. First issuer application 409 may authenticate the user of first user device 432 using authentication system 414 and hardware associated with first user device 432, as previously discussed.

Having pre-staged the transaction, first user device 432 can be used in conjunction with ATM 402 to facilitate the transaction, e.g., withdrawing funds from ATM 402. To do so, ATM 402 displays a visual code that comprises terminal-specific information, such as terminal capabilities, supported EMV AIDs, and a call-back URI, among other things. Upon scanning the visual code, first user device 432 obtains the encoded terminal-specific information, including acquirer and issuer keys 426 that is used to encode the pre-staged information into a cryptographic token. The encoded information is passed from first user device 432 to first issuer server 408.

For aspects of the technology that use EMV, supported EMV application IDs (AIDs) can also be encoded into the visual code. Generally, if EMV card specifications are used for card authentication, there is an application on the chip associated with the card (e.g., the financial instrument). The application can have certain behavior that is stored in a profile called an "AID." A chip card could have multiple AIDs, for example, one for one company and another for a different company. The terminal supplying this information (such as ATM 402) allows TxP servers (e.g., first issuer server 408 or second issuer server 416) to select the right application to use for compatibility. This is one specific way to increase the number of various financial instrument types that can be used with the technology, as this allows the TxP servers to process the transaction by selecting the correct application, even though the chip card was not physically presented at the terminal.

First issuer server 408 uses the encoded information received from first user device 432 to perform a chip-card-like transaction, including generating a dynamic card authentication cryptogram. Upon successful generation of the cryptographic token, first issuer server 408 can gather the transaction information used by ATM 402 to initiate the transaction, including track data, withdrawal amount, and EMV data, including the cryptographic token. It will be understood that a chip-card like transaction using HCE is one example that can be employed by first issuer server 408 in conjunction with this technology. However, at first issuer server 408, transaction information received from ATM 402 can be processed using other methods. Other methods that can be used in addition to or in lieu of HCE methods include using a financial instrument number and expiration date, a biometric data element, or a routing number, among other like examples.

The transaction information can then be sent from first issuer server 408 to ATM 402 via the call back URI received from the visual code data. ATM gateway 430 can be used to route the transaction information from first issuer server 408 to ATM 402. ATM 402 can use the transaction information to initiate a cash withdrawal request to acquiring switch 429, which processes the transaction like a physical EMV card transaction. To process the transaction, ATM 402 dispenses funds in accordance with the withdrawal amount. ATM 402 sends an acknowledgment that the transaction has been processed to first issuer server 408. First issuer application 409 may update the status of the pre-staged transaction and provide the updated status via first user device 432 (e.g., via the mobile application).

It will be recognized that the same or similar operations can be performed between ATM 402, second user device 434, and second issuer network 406. The method is not repeated here for brevity. Second user device 434 and second issuer network 406 are provided in the illustration to represent the interoperability of the various components. That is, it illustrates one or more issuer servers, from one or more issuers, working with ATM 402, or any other ATM having a similar software plug-in.

Figure 5:
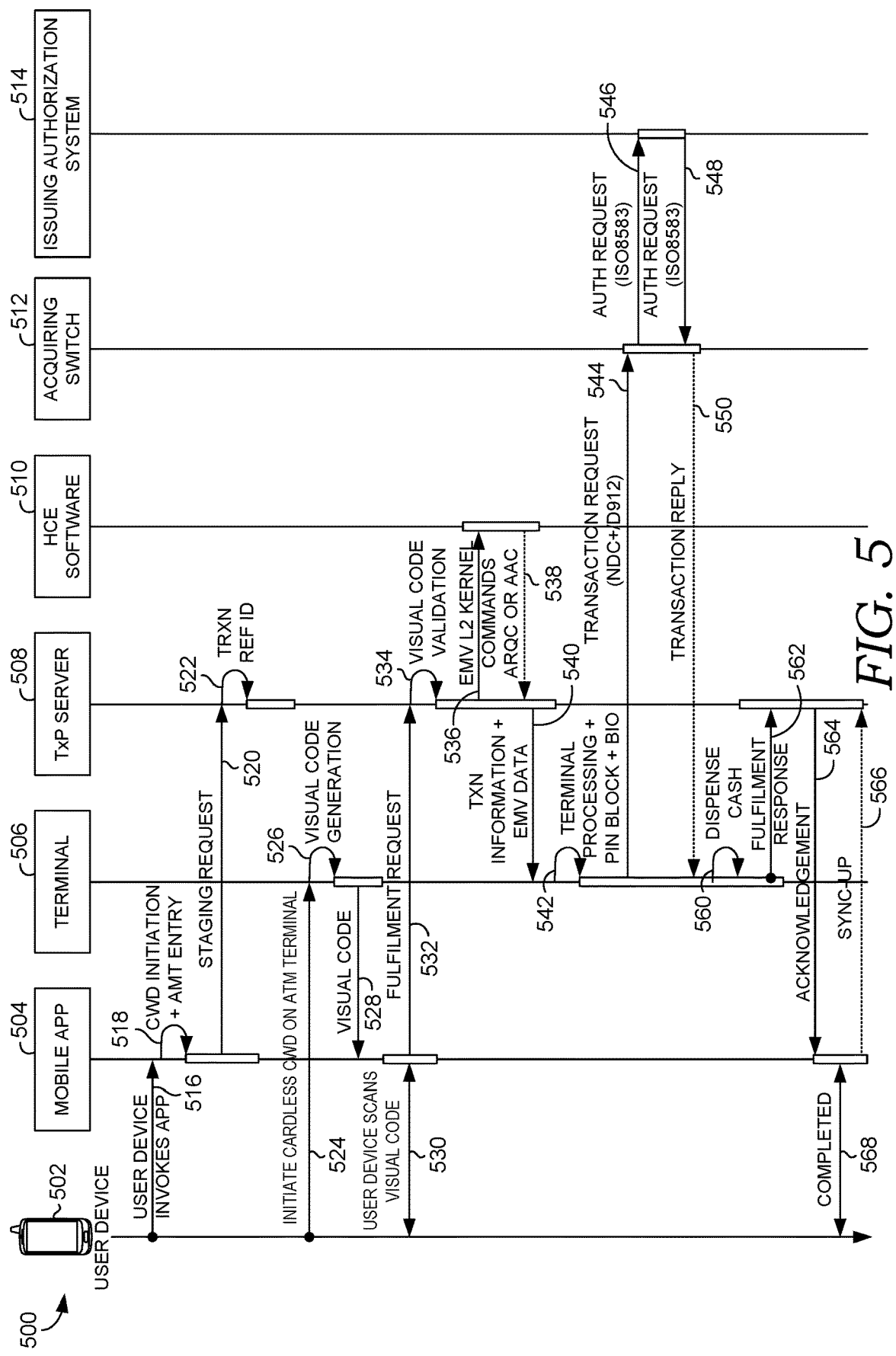
FIG. 5 is a flow chart of an example method for facilitating withdrawal of funds from a terminal, in accordance with an aspect described herein.

Turning now to FIG. 5, a flow chart having example method 500 for facilitating a withdrawal of funds from an ATM using user device 502 is provided. The system supporting method 500 includes mobile application 504, which may be executed by user device 502. It further comprises terminal 506, which is an ATM in this particular example. The system comprises issuer server 508, labeled as "TxP Server." The system is further illustrated as having HCE software 510, which in some cases may be included as part of an issuer network comprising issuer server 508, and may be executed by issuer server 508. The system is also shown including acquiring switch 512, which may also be called an "acquirer server." Further, the system used with method 500 also includes an issuing authorization system, which may too be included as part of an issuer network comprising issuer server 508, similar to user authentication engine 228 of FIG. 2.

Method 500 begins with user device 502 invoking mobile application 504 at step 516. This may be performed by receiving inputs at user device 502 from a user wishing to initiate a withdrawal of funds using user device 502. Mobile application 504 can be provided by an issuer for execution by user device 502. As part of this process, mobile application 504 may display options for adjustable parameters or receive inputs for adjustable parameters that are associated with the transaction. For example, this may include mobile application 504 providing a list of one or more financial instruments via the display of user device 502, and receiving a selection of a financial instrument for the transaction. User device 502 may also receive as inputs an amount of funds to be withdrawn using the financial instrument at this step.

At step 518, mobile application 504 provides a card withdrawal initiation and transaction amount entry. Having received the adjustable parameters, mobile application 504 can initiate a staging request to issuer server 508, as shown at step 520. The staging request can include elements such as a cryptographic token that is an encrypted form of information associated with the financial instrument, such as a financial instrument number. The staging request may also include a transaction amount that is the amount to be withdrawn. In some cases, the staging request includes a transaction currency code. The staging request can include any of the adjustable parameters provided to mobile application 504.

In some cases, issuer server 508 applies a transaction reference ID to the staging request, as shown at step 522. The staging request along with the reference ID can be saved for later reference.

At step 524, a cardless cash withdrawal can be initiated by a user at terminal 506 (e.g., the ATM). This may be performed by selecting an option for a cardless withdrawal at the ATM. This can initiate a software plug-in to instruct terminal 506 to perform operations that include generating a visual code, such as a QR code, along with waiting for a pre-defined time for a call-back. The generation of the visual code by the terminal is illustrated as step 526. The call-back information can be provided via a URI that is encoded within the visual code. Other terminal-specific information that can be encoded within the visual code may include an acquirer identifier for identifying and acquirer or acquirer server associated with terminal 506, terminal capabilities, a terminal country code, a transaction date, an unpredictable number (e.g., a dynamic cryptogram), the call-back URI, a list of supported AIDs, and a hash value.

At step 528, the visual code is captured by mobile application 504. To capture the visual code, a user device can invoke mobile application 504 and scan the visual code, as shown at step 530. The transaction reference number generated by issuer server 508 can be included in the encoded information latent in the visual code.

The transaction reference number can be used to initiate a fulfilment request, shown at step 532, which is provided from mobile application 504 to issuer server 508. The fulfillment request can comprise any of the transaction information, such as terminal acquirer identifier that identifies terminal 506, the terminal capabilities, the terminal country code, the transaction date, the unpredictable number, the call-back URI, the list of supported AIDs (where HCE is used), the hash value, the transaction reference number, and the like.

At issuer server 508, at step 534, the visual code is validated. Using the transaction reference number, issuer server 508 can fetch the stored staged transaction data. The stored staged transaction data, including the dynamic cryptographic token and transaction amount, can be used to validate the visual code. In validating the visual code, EMV L2 Kernal Commands can be given to HCE software 510 at step 536 and in response, HCE software 510 responds via ARQC or AAC. This validates the hash value and ensure the integrity of the message from terminal 506. Said differently, after having successfully validated the authenticity of the visual code, the issuer server may proceed with the next step. The next step is to generate the transaction data to return to the terminal, e.g., the ATM. If the flow was as described (prestaged) the issuer has all of the data it needs. If the flow was not prestaged, it will interact with the user device yet to capture all of the user preferences. In the case where EMV HCE is used, the cryptogram is generated by calling the HCE engine.

Issuer server 508 can then provide the transaction information, including any HCE or similar cryptogram, along with the EMV data to terminal 506, illustrated at step 540. This may be passed through an ATM gateway per the URI in the visual code. In doing so, the ATM gateway can forward the request to the terminal plug-in or the terminal plug-in will have the capability to poll for any messages received by the ATM gateway. This might vary based on the acquirer architecture of the ATM gateway. The terminal plug-in can populate the ATM transaction request buffers and give control back to an ATM software. Terminal 506, at step 540, requests a secure PIN number associated with the financial instrument, biometric identification, or other form of identification, shown at step 542.

Upon confirming the PIN number, biometric identification, or other form of identification terminal 506 can process a transaction request at step 544. This can be performed using, for example, NDC+/D912 standards. Terminal 506 gathers the transaction data used to initiate the transaction, e.g., the withdrawal, and provides the transaction request at step 544. Examples of transaction data at this stage that can be used to initiate the transaction include Track II Data, the withdrawal amount, the transaction reference number, and DE-55 data containing EMV tags. This can be provided to acquiring switch 512 as part of the transaction request at step 544.

Acquiring switch 512 may process the transaction request similar to a transaction request initiated by a physical card by utilizing issuing authorization system 514, e.g., step 546, which is then passed back to acquiring switch 512 at step 548. At step 550, acquiring switch 512 can route the transaction reply back to terminal 506 using the call-back URI.

At this point, terminal 506, the ATM in this example, dispenses cash in accordance with the transaction information of the transaction request, shown at step 560. The terminal plug-in can also provide instruction to terminal 506 to send a fulfillment response to issuer server 508 via the ATM gateway at step 562, followed by an acknowledgement from issuer server 508 to mobile application 504 at step 564. Mobile application 504 and issuer server 508 can be synced to ensure accurate record keeping without an intermediary, as illustrated at step 556. An indication that the transaction has been completed can be provided at user device 502 using mobile application 504, as illustrated at step 568.

Figure 6:
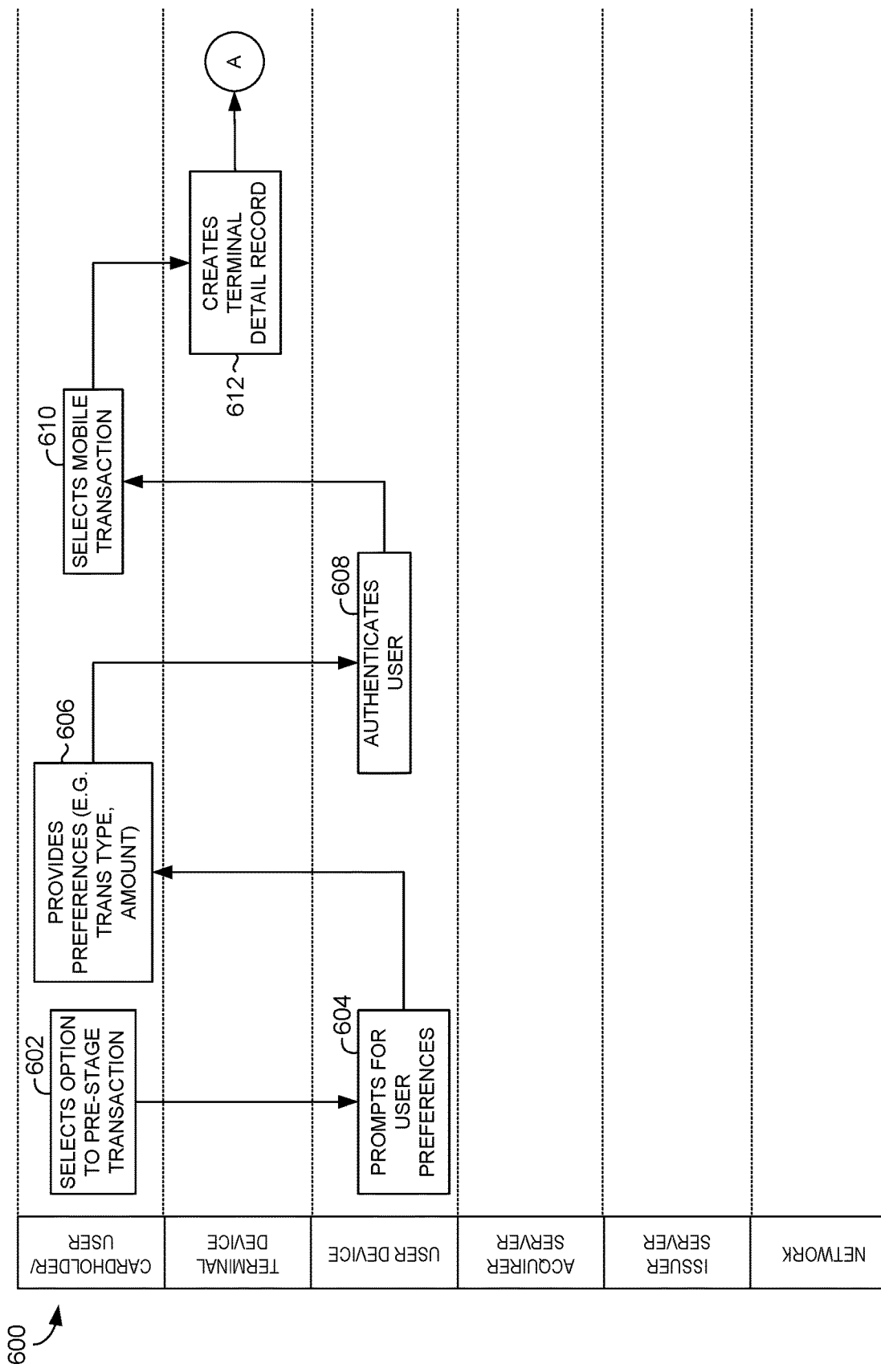
FIGS. 6-10 are flow charts of example methods for facilitating a transaction using a visual code, in accordance with aspects described herein.
Figure 6:
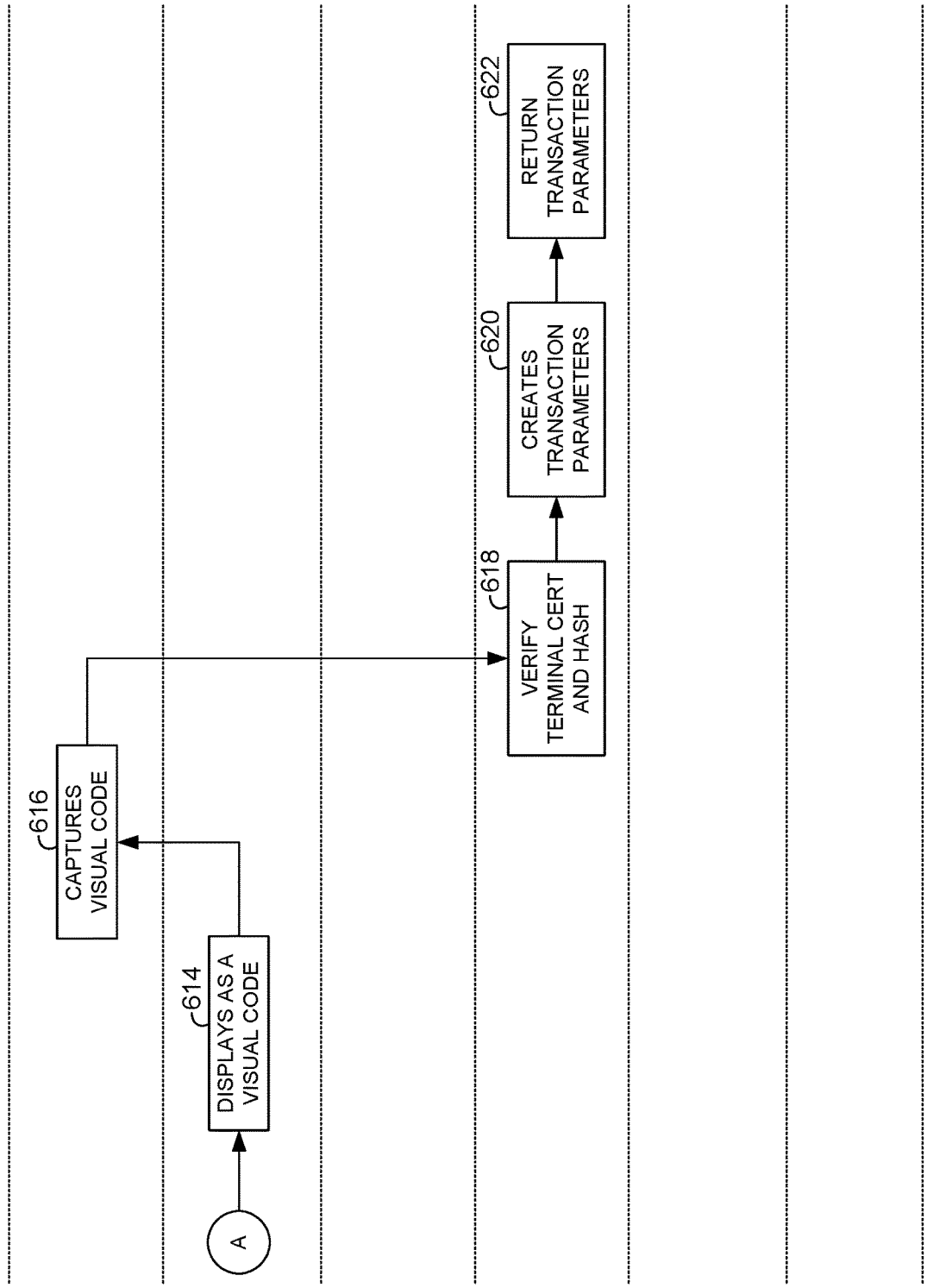

With reference now to FIG. 6, a flow diagram of example method 600 for generating transaction preferences for a transaction using a user device remote from a terminal device is illustrated. The user device allows the user to pre-stage the transaction at a location remote from the terminal device, such as an ATM. Pre-staging the transaction can be done prior to engaging the terminal device. That is, pre-staging the transaction can be done at the user device non-contemporaneously with interaction between the user device and the terminal device.

At block 602, a user selects an option to pre-stage a transaction by providing an input to the user device. The user device receives the input indicating an option has been selected to pre-stage the transaction. These actions can be performed while the user device is in proximity to the terminal device, e.g., is within communication range of the terminal device.

At block 604, the user device can prompt the user for preferences, including transaction preferences. The prompt can request that inputs be received identifying the adjustable parameters related to the transaction. At block 606, the user provides the transaction preferences via inputs at the user device. For example, the user may identify a financial instrument and a transaction amount, etc.

At block 608, the user device authenticates the user. Authentication engine 206 of FIG. 2 is suitable for performing the authentication.

The transaction is now pre-staged, and the user device is suitable for use in conjunction with a terminal device to facilitate the pre-staged transaction.

At block 610, a user can select an option at a terminal device to begin a pre-staged transaction facilitated using the user device. The terminal device receives the selection as an input and can initiate a plug-in to execute the instructions for facilitating the transaction in conjunction with the user device. Upon receiving the input to begin the pre-staged transaction, at block 612, the terminal device creates a terminal detailed record. The terminal detailed record can be created under operations of the plug-in to retrieve terminal-specific information, an encryption key, and a call-back URI. The terminal detailed record can be encoded in a visual code, such as a QR code, and displayed at the terminal device. The terminal detailed record may also be referred to as "terminal parameters."

At block 616, the user captures the displayed visual code. This can be done by executing a feature on the application that provides a visual code reader that can decode the latent information in the visual code to identify the terminal detail record.

At block 618, the user device uses the terminal public key to verify that the hash provided in the QR code was signed by the terminal private key. The data elements provided in the QR code are hashed to compare with the hash provided in the QR code to verify they were not altered. The user device can validate the terminal certificate against a certificate revocation list of a certificate authority. Using a root public key from the certificate authority, the user device can verify that the terminal certificate is valid.

At block 620, the mobile device can create the transaction parameters that are within the terminal capabilities as identified from the terminal detailed record. The transaction parameters, at this stage, define the transaction to be processed. In some cases, the user device can use the terminal-specific information to restrict choices to only those supported by the terminal device. For example, if the terminal device does not allow for deposits, then the user will not be allowed to select that transaction type. In the case of cash withdrawals at the terminal device (such as an ATM terminal), one transaction parameter can include the available canister denominations, e.g., such as the denomination size and type available to be dispensed by the terminal device. At this stage, the user device can perform optional authentication that may be required by the issuer server, such as entry of a passcode or biometric scan.

A cryptogram, such as a dynamic cryptogram, can be included with creating the transaction parameters at block 620. In some implementations, the cryptogram can be used as an Authorization Request Cryptogram (ARQC), which like HCE, would be similar to a chip-card transaction. At block 622, the user device encrypts a transaction parameters message and returns it to the terminal or acquirer via the call-back URI.

Figure 7:
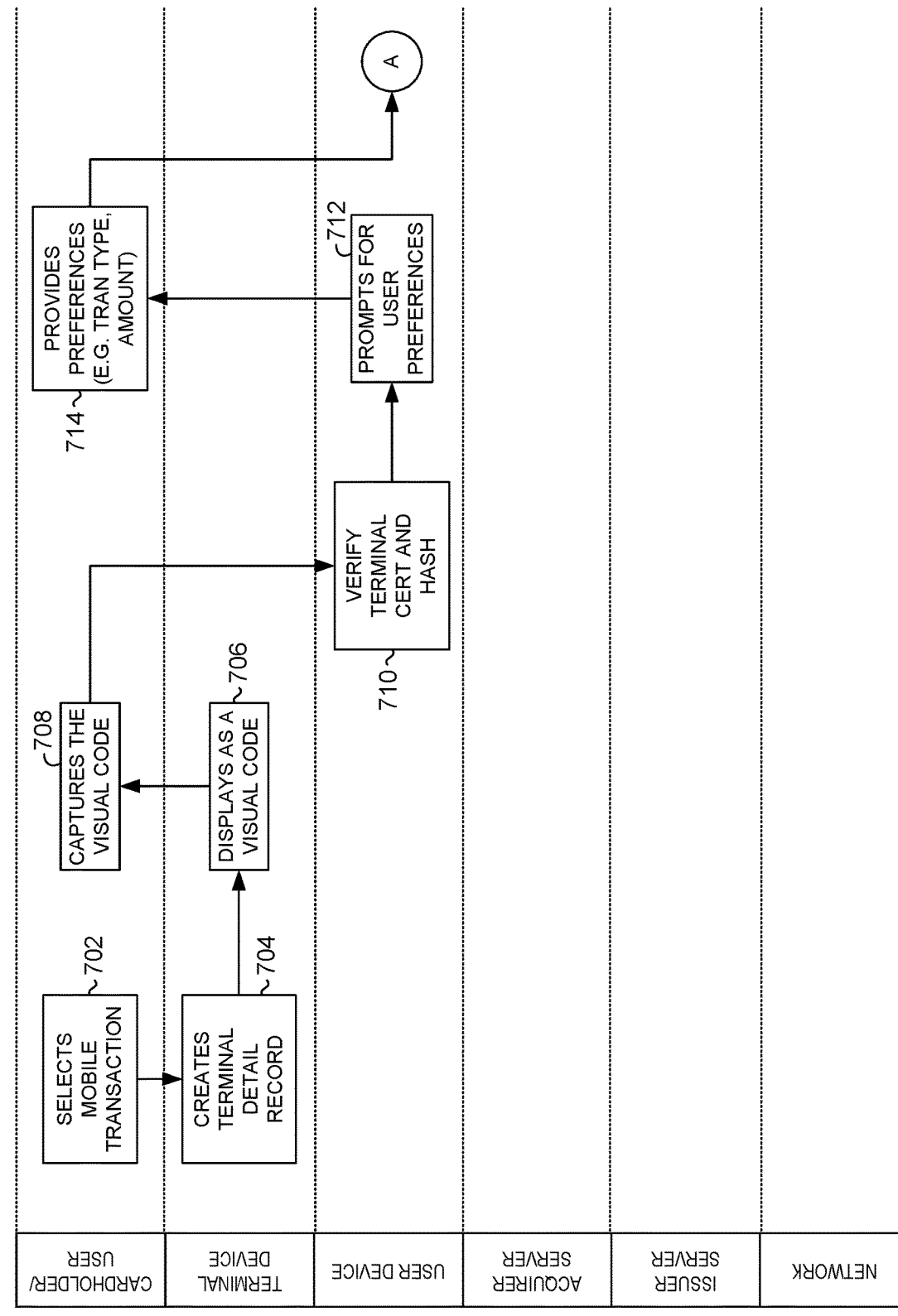

FIG. 7 is provided to illustrate example method 700 for generating transaction parameters using a user device at the time of the transaction. Using this method, the user device can pre-stage a transaction contemporaneously with interaction between the user device and the terminal device.

At block 702, the user selects an option to initiate a mobile transaction using a visual code at the terminal device, such as an ATM. The terminal device receives the selection as an input. In response to the selection to initiate the mobile transaction, the terminal device creates a terminal detail record at block 704, which can include terminal-specific details, an encryption key, and a call-back URI, among other things. The created terminal detail record can be encoded as latent information of a visual code.

At block 706, the visual code is provided. This can be provided via a display of the terminal device. The provided visual code is captured at block 708 by the user using the user device. Here, the user device receives the image as an input and decodes the image to identify the terminal detail record.

User device 710 can verify the terminal certificate or hash using methods previously discussed. Upon verification, the mobile device can prompt the user for transaction preferences, as shown at block 712. Options for selection can be provided by the mobile device. The options can be limited based on the available adjustable parameters determined based on the terminal-specific information. This may limit the available options to only those options that are within the capabilities of the terminal device. Using this, the user can provide the transaction preference at block 714. The transaction preferences as selected by the user are received at the user device.

The user device, at block 716, may authenticate the user using methods previously described. The user device creates the transaction parameters based on the received transaction preferences. This can be done by creating a transaction parameter message and encrypting the message. The created transaction parameters are returned at block 720 via the call-back URI.

Figure 8:
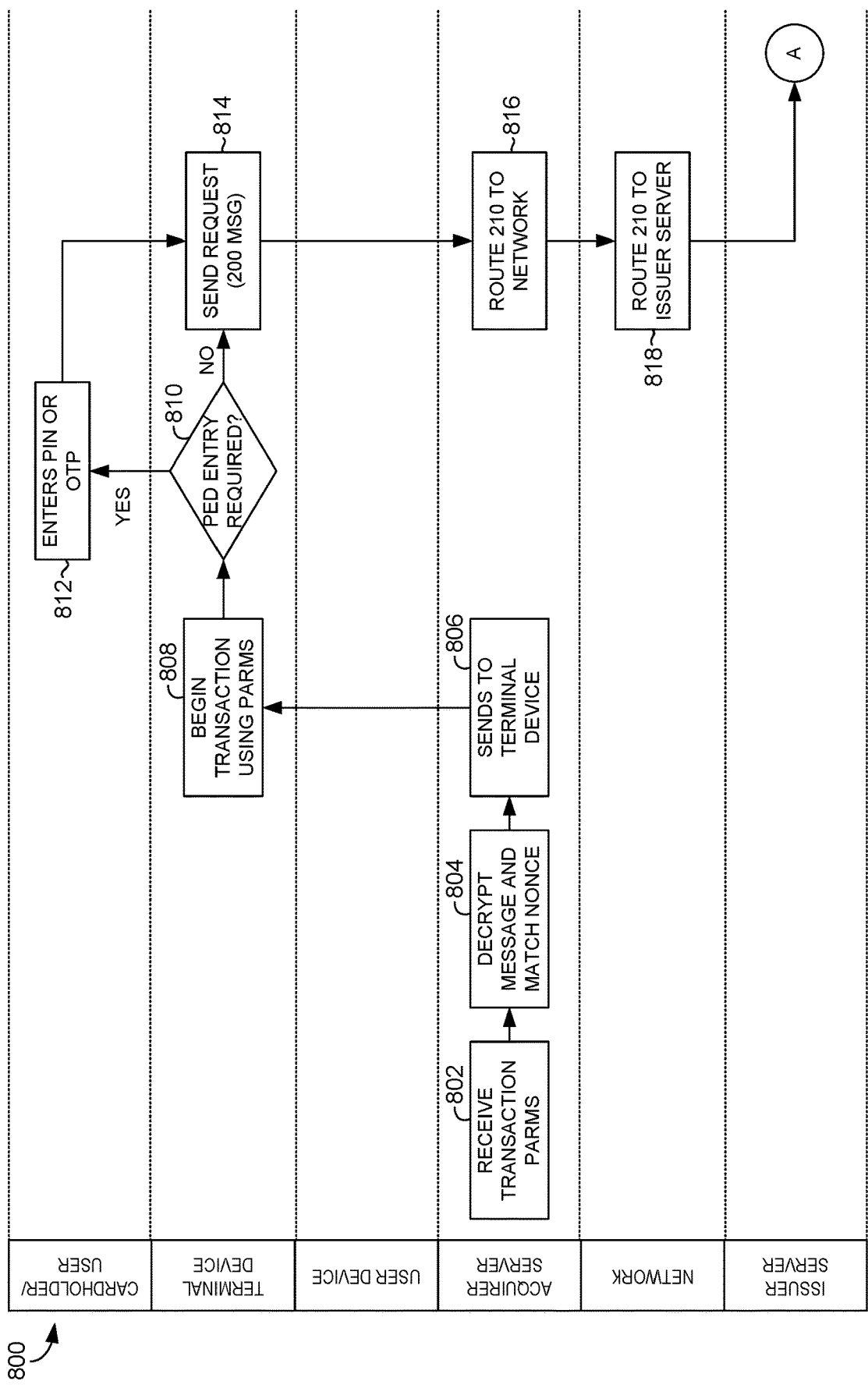
Figure 8:
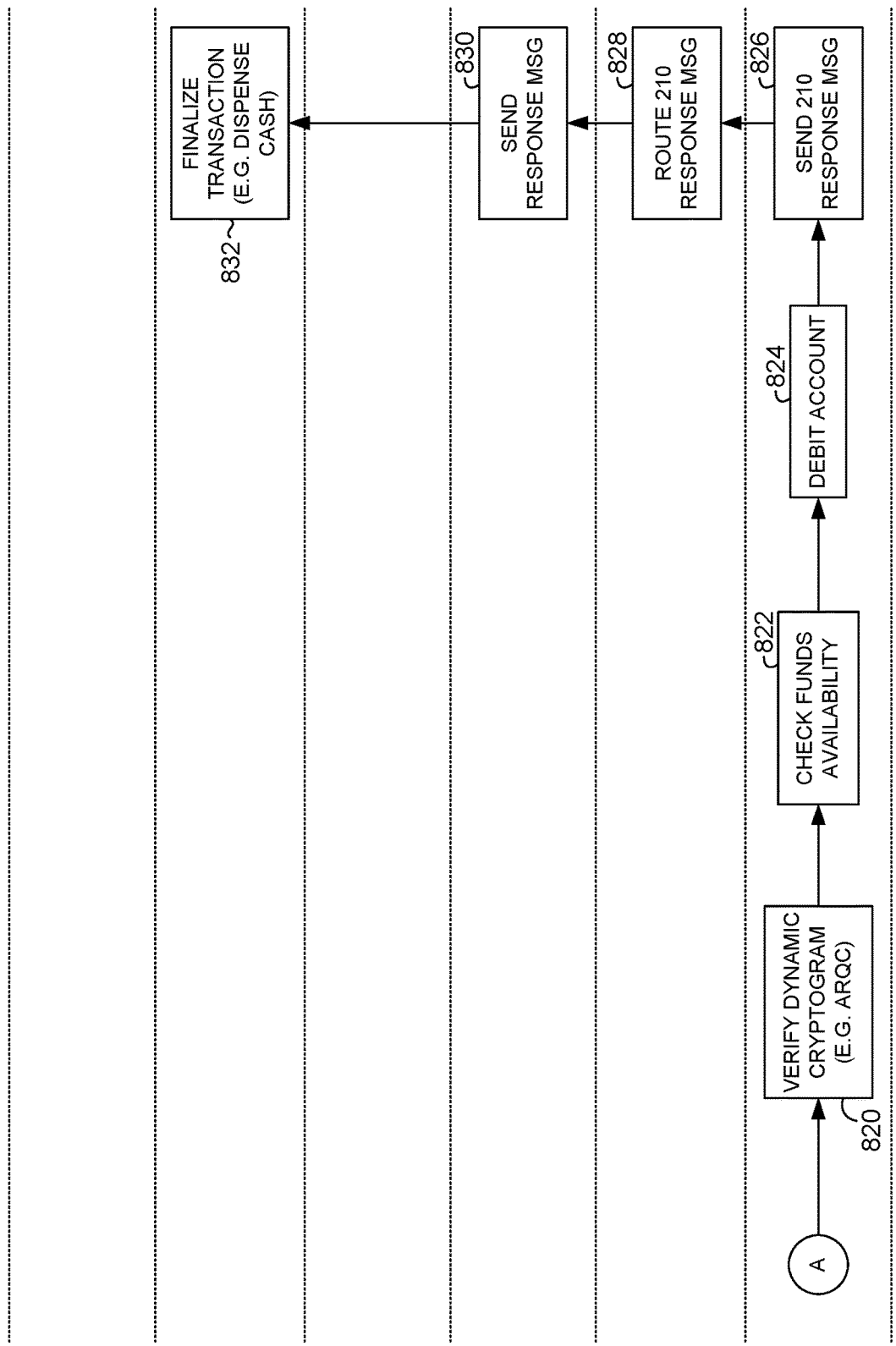

FIG. 8 provides example method 800 for facilitating a transaction at a terminal device based on received transaction parameters. Method 800 is similar to an HCE transaction from the point of view of the various components, and as such, is not described in great detail.

To begin, an acquirer server can receive transaction parameters at block 802. The transaction parameters can be received from the mobile device based on the call-back URI as described with respect to FIG. 7. Continuing with FIG. 8, the acquirer server can decrypt the received transaction parameters, which can be an encrypted message having the transaction preferences and the information passed from the visual code at block 804. In doing so, the acquirer server verifies the message is legitimate and matches the message to the correct terminal. At block 806, the message is sent to the correct terminal device, e.g., through a terminal gateway, such as an ATM gateway. The message can be signed by the acquirer server using the encryption key provided by the terminal through the visual code.

At block 808, the terminal device receives the transaction parameters and begins to process the transaction accordingly. This maybe done using ISO 8583 standards. Part of facilitating the transaction may require authentication of the user via a PIN Entry Device (PED), as illustrated at block 810. If a PIN or other form of authentication is required, method 800 proceeds to block 812, where the user enters the PIN or other form of secure authentication information. Method 800 then proceeds to block 814, where the terminal device sends the request to facilitate the transaction. If PED entry is not required, then method 800 proceeds directly to block 814.

At block 814, the terminal device routes the transaction parameters to the acquirer server. At block 816, the acquirer server routes the transaction parameters via the network at block 818 to an issuer sever.

At the issuer server, the cryptogram can be verified (e.g., ARQC), shown at block 820. Upon identifying the encrypted information, at block 822, the issuer server can validate whether the transaction can be processed by checking the available funds in the account identified in the transaction parameters. The account can be debited based on the withdrawal amount indicated in the transaction parameters, as shown at block 824. The response that the transaction has been validated by the issuer processor can be routed at block 826 from the issuer server via the network at block 828 back to the acquirer server.

The acquirer server can then route a response message, at block 830, back to the correct terminal device. This can be done using a terminal gateway. At block 840, having received the validation response, the terminal device can process the transaction. At block 840, the transaction is finalized by the terminal device (the ATM) by dispensing the funds in accordance with the withdrawal amount.

Because this stage of the transaction, including collecting the transaction parameters and the cryptogram, appears similar to a chip-card transaction or NFC HCE, the method is able to leverage existing ISO 8583 data elements for chip-card transactions. The issuer server can be able to verify the transactions in the same manner as other chip-card transactions containing an ARQC.

Figure 9:
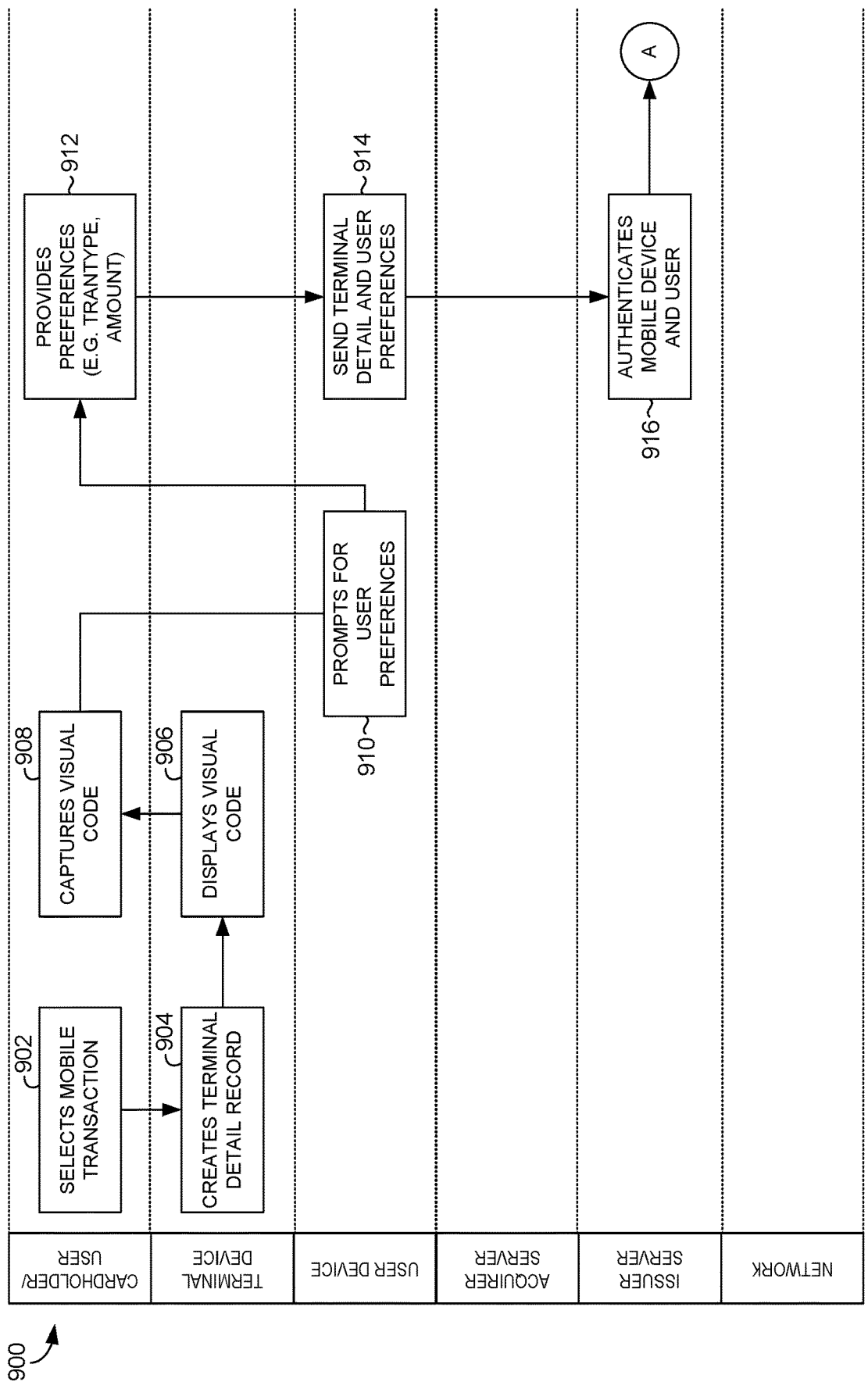

FIG. 9 provides another example method 900 for facilitating a transaction using a user device in conjunction with a terminal device. Method 900 includes a user initiating a mobile transaction at a terminal device by selecting a mobile transaction option at block 902. In another embodiment, the transaction is initiated remotely from the terminal device by selecting a particular terminal device via the application, which may provide a list of available terminal devices to facilitate a transaction. This selection is received at the terminal device as an input or at the user device as an input, depending on the embodiment. By remotely selecting the terminal via that application, the method can provide the user with only those available adjustable parameters depending on the terminal, while not requiring the user to be present at the terminal to identify this information.

At block 904, the terminal device creates a terminal detail record. The terminal detail record is encoded into a visual code that is displayed by the terminal at block 906. The user captures the visual code using the user device at block 908. The user device can prompt the user for transaction preferences at block 910. The transaction preferences that are requested by the user device can be limited based on the capabilities of the terminal as identified by terminal-specific information included in the terminal detail record. The transaction preferences are received at the user device as inputs from the user. At block 914, the terminal detail record and the transaction preference can be sent to the issuer server.

At block 916, the issuer server authenticates the user of the user devices based on the received information. The issuer server creates the transaction parameters at block 918 based on the transaction preference and the terminal detail record. The transaction parameters are returned via a callback URI provided with the terminal-specific information.

Figure 10:
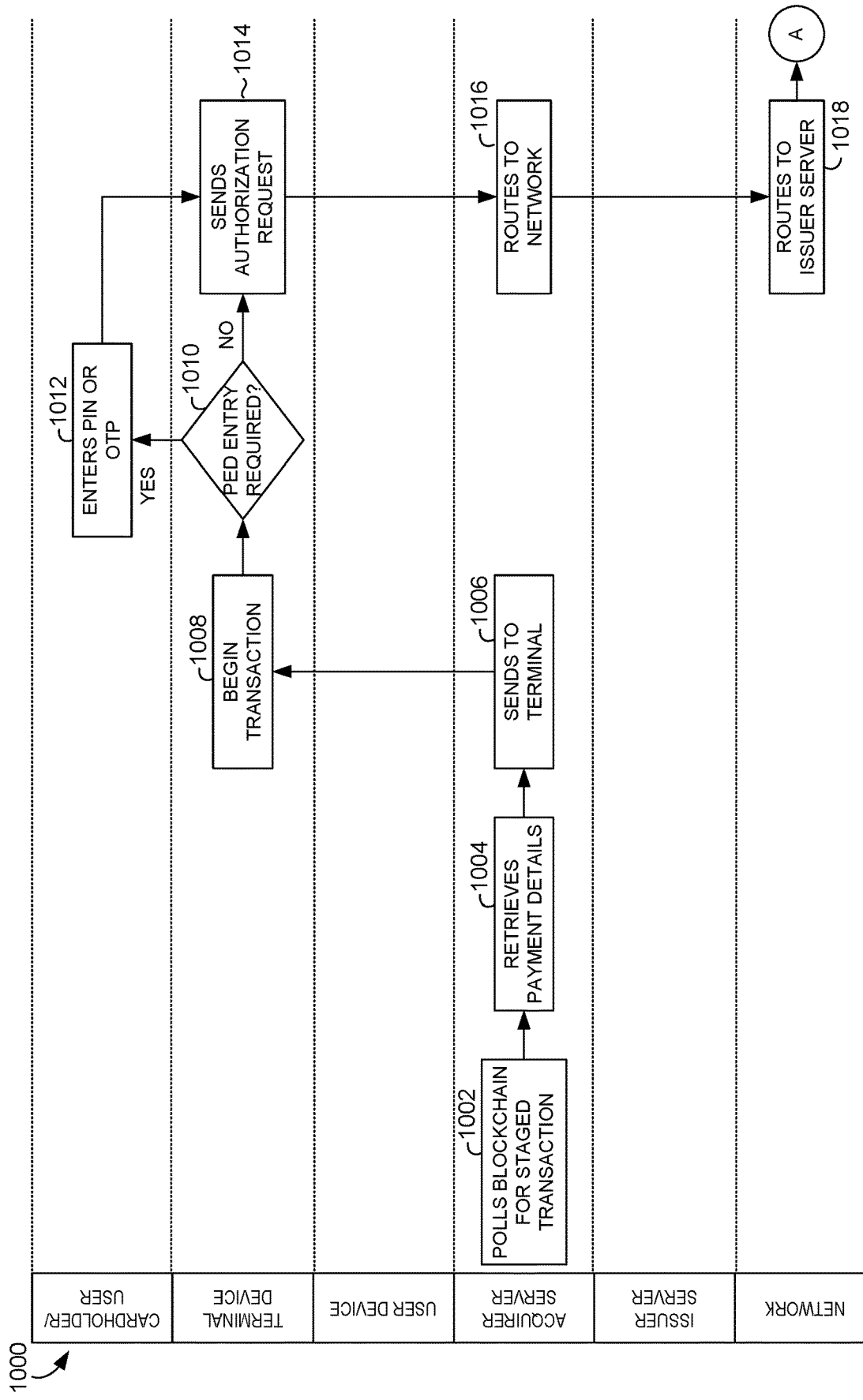
Figure 10:
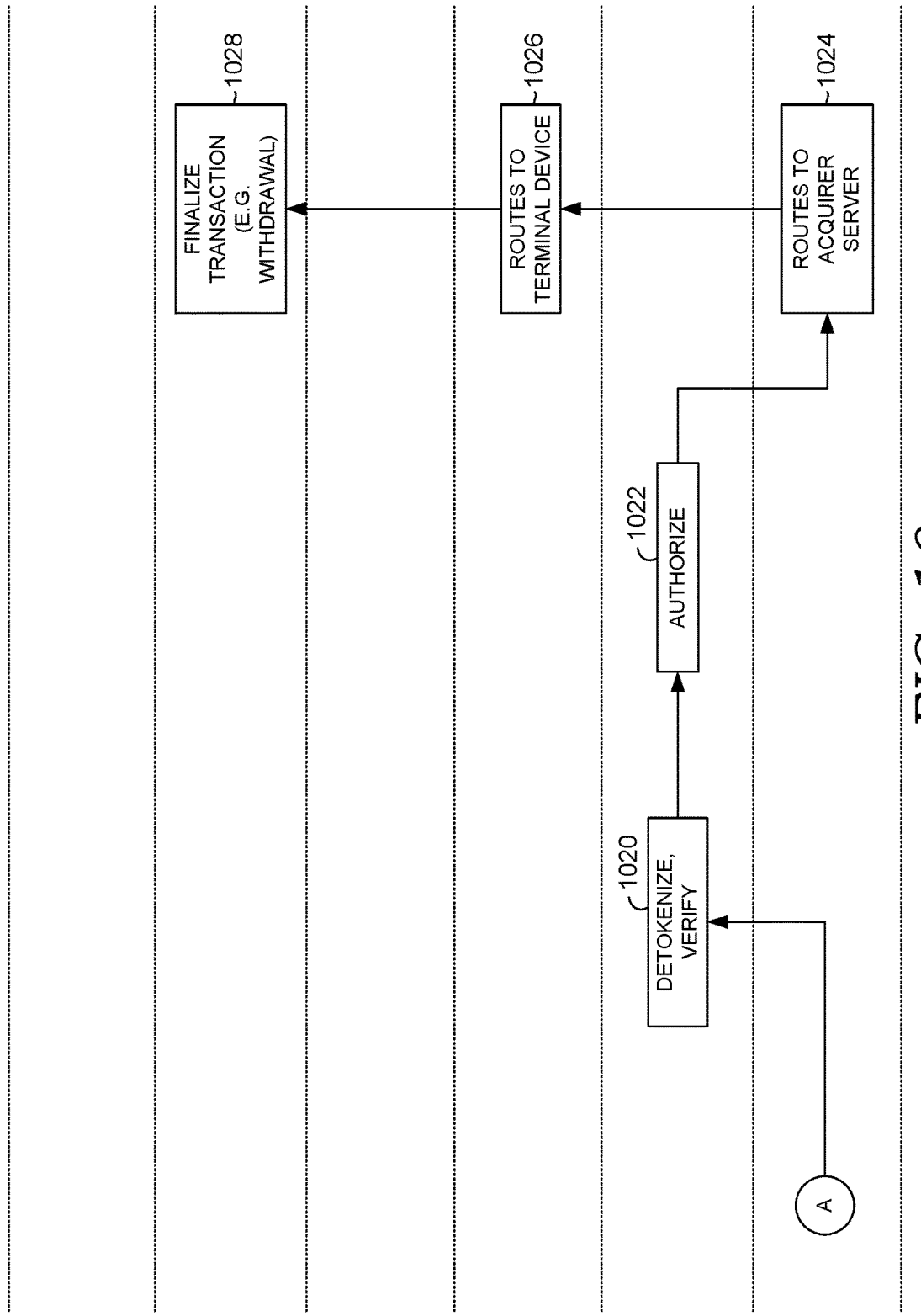

FIG. 10 is another example method 1000 for facilitating a transaction using a user device in conjunction with a terminal device. FIG. 10 illustrates a decentralized type transaction. This can be done via distributed ledges, such as blockchain technology. As noted above, an acquirer server can also poll for a staged transaction. At block 1002, the acquirer server can poll a blockchain to identify a pre-staged transaction. Upon identifying a pre-staged transaction, the acquirer server can retrieve the payment details from the pre-staged transaction at block 1004. The payment details are sent to a terminal device from the acquirer server at block 1006.

Upon receiving the payment details at the terminal device, the terminal device begins to facilitate the transaction, illustrated at block 1008. It is determined at block 1010 whether there is a PED entry required. If so, method 1000 proceeds to block 1012, where the user enters a PIN or other form of unique identification. Method 1000 then proceeds to block 1014. If not, method 1000 proceeds directly to block 1014.

At block 1014, an authorization request is sent from the terminal device via the acquirer server, at block 1016, using the network at block 1018, to the issuer server.

At block 1020 the issuer server detokenizes the information. At block 1022, the issuer server authorizes the traction and routes the authorization back to the acquirer server at block 1024 via the network. The acquirer server, at block 1026, can route the authorization back to the terminal device. The terminal device can finalize the transaction in accordance with the payment details at block 1028. For instance, this can include withdrawing funds at an ATM.

Having described an overview of embodiments of the present technology, an example operating environment in which embodiments of the present technology may be implemented is described below in order to provide a general context for various aspects of the present technology. Referring initially to FIG. 11, in particular, an example operating environment for implementing embodiments of the present technology is shown and designated generally as computing device 1100. Computing device 1100 is but one example of a suitable computing environment and is not intended to suggest any limitation as to the scope of use or functionality of the technology. Neither should computing device 1100 be interpreted as having any dependency or requirement relating to any one or combination of components illustrated.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 11, computing device 1100 includes bus 1110 that directly or indirectly couples the following devices: memory 1112, one or more processors 1114, one or more presentation components 1116, input/output ports 1118, input/output components 1120, and illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and it is reiterated that the diagram of FIG. 11 is merely illustrates an example computing device that can be used in connection with one or more embodiments of the present technology. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile or nonvolatile memory. The memory may be removable, non-removable, or a combination thereof. Example hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Examples of presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology described with reference to a distributed computing environment; however the distributed computing environment depicted herein is merely an example. Components can be configured for performing novel aspects of embodiments, where the term "configured for" can refer to "programmed to" perform particular tasks or implement particular abstract data types using code. Further, while embodiments of the present technology may generally refer to the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

Additional embodiments of the invention comprise:

Embodiment 1

A non-transitory computer storage medium storing computer-useable instructions that, when used by at least one processor of a mobile device, cause the mobile device to perform operations comprising: generating pre-staged transaction preferences based on a set of inputs received via a displayed GUI, the received set of inputs corresponding to a transaction amount and a unique account identifier; responsive to communicating the pre-staged transaction preferences to an issuer server, receiving a pre-staged transaction identifier from the issuer server; capturing a visual code displayed by a terminal device using a camera coupled to the mobile device; decoding the visual code to reveal terminal parameters associated with the terminal device, the terminal parameters including a uniform resource indicator (URI) that corresponds to the terminal device, capabilities of the terminal device, and a public encryption key associated with a private encryption key stored in a memory of the terminal device; generating a request based on the terminal parameters and the pre-staged transaction identifier; communicating the request to the issuer server, wherein the issuer server is configured to generate transaction parameters based on the pre-staged transaction preferences and a dynamic cryptogram that is generated based at least in part on the capabilities of the terminal device, wherein the generated transaction parameters are encrypted with the public encryption key; and causing the issuer server to communicate the encrypted transaction parameters to the terminal device via the URI.

Embodiment 2

The medium of Embodiment 1, wherein the terminal device is configured to decrypt the encrypted transaction parameters with the stored private encryption key.

Embodiment 3

The medium of Embodiment 2, wherein the terminal device is further configured to generate a transaction request based on the decrypted transaction parameters.

Embodiment 4

A non-transitory computer storage medium storing computer-useable instructions that, when used by at least one processor of an issuer server, cause the issuer server to perform operations comprising: receiving a unique identifier and a plurality of terminal parameters from a mobile computing device, wherein the plurality of terminal parameters is associated with a terminal device and includes a defined set of capabilities of the terminal device and a public key associated with a private key stored in a memory of the terminal device that corresponds to the terminal device; determining an account based on the unique identifier and a dynamic cryptogram based on the plurality of terminal parameters; generating a set of transaction parameters based on the determined account and at least a portion of the plurality of terminal parameters, the generated set of transaction parameters including the dynamic cryptogram; encrypting the set of transaction parameters utilizing the public key included in the received plurality of terminal parameters; and communicating the encrypted set of transaction parameters to a distributed ledger node, wherein the distributed ledger node is configured to store the encrypted set of transaction parameters to a blockchain; and causing the terminal device or an acquirer server associated with the terminal device to parse the encrypted set of transaction parameters from the blockchain based on a periodic polling of the distributed ledger node.

Embodiment 5

A non-transitory computer storage medium storing computer-useable instructions that, when used by at least one processor of an acquirer server, cause the acquirer server to perform operations comprising: polling a blockchain maintained by at least one node for a set of transaction parameters associated with a terminal device, the terminal device being associated with the acquirer server; parsing the set of transaction parameters from the blockchain; communicating the parsed set of transaction parameters to the terminal device; and causing the terminal device to generate a transaction request based on the communication.

Embodiment 6

The medium of Embodiment 5, wherein the set of transaction parameters is encrypted with a public key associated with the terminal device.

Embodiment 7

A method, system, or computer readable medium comprising any feature, process, and/or step described, individually or in combination with any other feature, process, and/or step, in any configuration and/or order.

Embodiment 8

A product of any of the above embodiments comprising any feature described, individually or in combination with any feature, in any configuration.

Embodiment 9

A system of any of the above embodiments comprising any feature described, individually or in combination with any feature, in any configuration.

Embodiment 10

A computer-implemented method of any of the above embodiments comprising any process described, in any order, using any modality.

Embodiment 11

A non-transitory computer storage medium storing computer-useable instructions that, when used by at least one processor of a computing device or any feature described, cause the computing device or the any described feature to perform any of the operations described, in any order, using any modality.

What is claimed is:

1. A non-transitory computer storage medium storing computer-useable instructions that, when used by at least one processor of a terminal device, cause the terminal device to perform operations comprising:
   obtaining terminal parameters associated with the terminal device, the terminal parameters including capabilities of the terminal device that indicate functions performable by the terminal device, a public key associated with a private key stored in a memory of the terminal device, and a uniform resource indicator (URI) that corresponds to the terminal device;
   encoding the terminal parameters to generate a visual code associated with the terminal device, the encoded terminal parameters at least comprising the capabilities of the terminal device, wherein the visual code is configured to communicate the encoded terminal parameters to a user computing device;
   providing the visual code to a display coupled to the terminal device, the displayed visual code presenting the encoded terminal parameters comprising the capabilities of the terminal device, wherein providing the visual code for display causes, by communication of the terminal parameters, the user computing device to limit transaction parameters to a set of transaction parameter options corresponding to the capabilities of the terminal device;
   receiving a set of transaction parameters selected based on the set of transaction parameter options, the set of transaction parameters encrypted with the public key from an issuer server via the URI, the set of transaction parameters including a dynamic cryptogram generated based on the terminal parameters;
   decrypting the encrypted set of transaction parameters with the stored private key; and
   performing the transaction in accordance with the set of transaction parameters.

2. The medium of claim 1, wherein the visual code includes a quick response (QR) code.

3. The medium of claim 1, wherein the dynamic cryptogram is generated via host card emulation (HCE).

4. The medium of claim 1, further comprising, subsequent to providing the visual code for display, waiting a predetermined time to receive the set of transaction parameters.

5. The medium of claim 1, wherein the user computing device configured to decode the displayed visual code causes the issuer server to generate the set of transaction parameters.

6. The medium of claim 1, wherein an issuer associated with the issuer server is determined based on transaction preferences received from the user computing device, the transaction preferences including a selection of a financial instrument that identifies the issuer.

7. A terminal device comprising:
at least one processor; and
one or more non-transitory computer storage medium storing computer-useable instructions that, when used by at least one processor of the terminal device, cause the terminal device to perform operations comprising:
obtaining terminal parameters associated with the terminal device, the terminal parameters including capabilities of the terminal device that indicate functions performable by the terminal device, a public key associated with a private key stored in a memory of the terminal device, and a uniform resource indicator (URI) that corresponds to the terminal device;
encoding the terminal parameters to generate a visual code associated with the terminal device, the encoded terminal parameters at least comprising the capabilities of the terminal device, wherein the visual code is configured to communicate the encoded terminal parameters to a user computing device;
providing the visual code to a display coupled to the terminal device, the displayed visual code presenting the encoded terminal parameters comprising the capabilities of the terminal device, wherein providing the visual code for display causes, by communication of the terminal parameters, the user computing device to limit transaction parameters to a set of transaction parameter options corresponding to the capabilities of the terminal device;
receiving a set of transaction parameters selected based on the set of transaction parameter options, the set of transaction parameters encrypted with the public key from an issuer server via the URI, the set of transaction parameters including a dynamic cryptogram generated based on the terminal parameters;
decrypting the encrypted set of transaction parameters with the stored private key; and
performing the transaction in accordance with the set of transaction parameters.

8. The terminal device of claim 7, wherein the visual code includes a quick response (QR) code.

9. The terminal device of claim 7, wherein the dynamic cryptogram is generated via host card emulation (HCE).

10. The terminal device of claim 7, further comprising, subsequent to providing the visual code for display, waiting a pre-determined time to receive the set of transaction parameters.

11. The terminal device of claim 7, wherein the user computing device configured to decode the displayed visual code causes the issuer server to generate the set of transaction parameters.

12. The terminal device of claim 7, wherein an issuer associated with the issuer server is determined based on transaction preferences received from the user computing device, the transaction preferences including a selection of a financial instrument that identifies the issuer.

13. A computerized method comprising:
obtaining terminal parameters associated with a terminal device, the terminal parameters including capabilities of the terminal device that indicate functions performable by the terminal device, a public key associated with a private key stored in a memory of the terminal device, and a uniform resource indicator (URI) that corresponds to the terminal device;
encoding the terminal parameters to generate a visual code associated with the terminal device, the encoded terminal parameters at least comprising the capabilities of the terminal device, wherein the visual code is configured to communicate the encoded terminal parameters to a user computing device;
providing the visual code to a display coupled to the terminal device, the displayed visual code presenting the encoded terminal parameters comprising the capabilities of the terminal device, wherein providing the visual code for display causes, by communication of the terminal parameters, the user computing device to limit transaction parameters to a set of transaction parameter options corresponding to the capabilities of the terminal device;
receiving a set of transaction parameters selected based on the set of transaction parameter options, the set of transaction parameters encrypted with the public key from an issuer server via the URI, the set of transaction parameters including a dynamic cryptogram generated based on the terminal parameters;
decrypting the encrypted set of transaction parameters with the stored private key; and
performing the transaction in accordance with the set of transaction parameters.

14. The method of claim 13, wherein the visual code includes a quick response (QR) code.

15. The method of claim 13, wherein the dynamic cryptogram is generated via host card emulation (HCE).

16. The method of claim 13, further comprising, subsequent to providing the visual code for display, waiting a pre-determined time to receive the set of transaction parameters.

17. The method of claim 13, wherein the user computing device configured to decode the displayed visual code causes the issuer server to generate the set of transaction parameters.

18. The method of claim 13, wherein an issuer associated with the issuer server is determined based on transaction preferences received from the user computing device, the transaction preferences including a selection of a financial instrument, and wherein that identifies the issuer is determined based on the selection of the financial instrument.

* * * * *